US009891735B2

(12) United States Patent
Bae et al.

(10) Patent No.: US 9,891,735 B2
(45) Date of Patent: Feb. 13, 2018

(54) DISPLAY DEVICE INCLUDING TOUCH SENSING SENSOR

(71) Applicant: Samsung Display Co., Ltd., Yongin (KR)

(72) Inventors: Joo-Han Bae, Seongnam-si (KR); Jin Hwan Kim, Seoul (KR); Yun Ha Kim, Cheonan-si (KR); Se Jeong Won, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 42 days.

(21) Appl. No.: 14/741,824

(22) Filed: Jun. 17, 2015

(65) Prior Publication Data
US 2016/0154499 A1 Jun. 2, 2016

(30) Foreign Application Priority Data

Nov. 28, 2014 (KR) .......................... 10-2014-0169123

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04102* (2013.01); *G06F 2203/04103* (2013.01)

(58) Field of Classification Search
CPC ................................ G06F 3/044; G06F 3/0412
See application file for complete search history.

(56) References Cited

U.S. PATENT DOCUMENTS

| 5,051,739 | A | * | 9/1991 | Hayashida | ............... G09G 3/30 345/206 |
| 6,046,547 | A | * | 4/2000 | Nishio | ..................... G09G 3/30 313/500 |
| 8,629,842 | B2 | * | 1/2014 | Jang | ..................... G06F 3/0412 345/173 |
| 8,823,672 | B2 | * | 9/2014 | Kim | ....................... G06F 3/041 345/173 |
| 8,884,921 | B2 | * | 11/2014 | Kim | ....................... G06F 3/044 178/18.06 |
| 8,982,089 | B2 | | 3/2015 | Lim | |
| 9,046,955 | B1 | * | 6/2015 | Lee | ........................ G06F 3/0412 |
| 9,058,075 | B2 | * | 6/2015 | Lee | ........................ G06F 3/041 |
| 9,087,800 | B2 | * | 7/2015 | Jung | ..................... H01L 27/323 |
| 9,158,406 | B2 | * | 10/2015 | Chiu | ..................... G06F 3/0412 |

(Continued)

FOREIGN PATENT DOCUMENTS

| KR | 10-1084169 | 1/2010 |
| KR | 10-2011-0106116 | 9/2011 |

(Continued)

*Primary Examiner* — Patrick F Marinelli
(74) *Attorney, Agent, or Firm* — H.C. Park & Associates, PLC

(57) ABSTRACT

A display device includes: a substrate; a pixel driving circuit disposed in a first region on the substrate; an encapsulation layer disposed on the pixel driving circuit; a touch sensing layer formed on the encapsulation layer and including a touch sensing sensor; and a touch-driving layer including a touch driving circuit disposed in a second region on the substrate, integrally formed with the pixel driving circuit, and electrically connected to the touch sensing sensor to apply a signal thereto.

11 Claims, 16 Drawing Sheets

(56) References Cited

U.S. PATENT DOCUMENTS

| | | | |
|---|---|---|---|
| 9,164,615 B2* | 10/2015 | Cho | G06F 3/0412 |
| 9,292,118 B2* | 3/2016 | Lee | G06F 3/0412 |
| 9,366,897 B2* | 6/2016 | Choi | G02F 1/13338 |
| 9,367,162 B2* | 6/2016 | Lee | G06F 3/0412 |
| 2005/0184927 A1* | 8/2005 | Kwak | H01L 27/3276 345/45 |
| 2006/0214890 A1* | 9/2006 | Morishige | G09G 3/325 345/77 |
| 2008/0111493 A1* | 5/2008 | Son | H01L 27/3276 315/169.3 |
| 2010/0007616 A1* | 1/2010 | Jang | G06F 3/0412 345/173 |
| 2010/0110041 A1* | 5/2010 | Jang | G06F 3/0412 345/174 |
| 2011/0248968 A1* | 10/2011 | Suh | G02F 1/13454 345/204 |
| 2012/0262385 A1 | 10/2012 | Kim et al. | |
| 2013/0265244 A1* | 10/2013 | Kim | G06F 3/044 345/173 |
| 2013/0265277 A1* | 10/2013 | Yeh | G06F 3/0416 345/174 |
| 2013/0314343 A1 | 11/2013 | Cho et al. | |
| 2013/0335365 A1* | 12/2013 | Kim | G06F 3/044 345/174 |
| 2014/0071360 A1* | 3/2014 | Chang | G06F 3/0412 349/12 |
| 2014/0145979 A1* | 5/2014 | Lee | G06F 3/0412 345/173 |
| 2014/0176893 A1* | 6/2014 | Sugitani | G02F 1/133305 349/143 |
| 2014/0210767 A1* | 7/2014 | Hur | G06F 3/0412 345/174 |
| 2014/0253493 A1* | 9/2014 | Cho | G06F 3/0412 345/174 |
| 2014/0253502 A1* | 9/2014 | Cho | G06F 3/0412 345/174 |
| 2014/0347284 A1* | 11/2014 | Lee | G06F 3/041 345/173 |
| 2015/0001482 A1* | 1/2015 | Jung | H01L 27/323 257/40 |
| 2015/0002756 A1* | 1/2015 | Kim | G06F 3/0412 349/12 |
| 2015/0022484 A1* | 1/2015 | Chiu | G06F 3/044 345/174 |
| 2015/0042616 A1* | 2/2015 | Takagi | G06F 3/0412 345/174 |
| 2015/0049061 A1* | 2/2015 | Takagi | G06F 3/0412 345/174 |
| 2015/0130726 A1* | 5/2015 | Min | G06F 3/0412 345/173 |
| 2015/0145808 A1* | 5/2015 | Cho | G06F 3/0412 345/174 |
| 2015/0185903 A1* | 7/2015 | Park | G06F 3/044 345/173 |
| 2015/0185960 A1* | 7/2015 | Kim | G06F 3/0412 345/175 |
| 2015/0187845 A1* | 7/2015 | Kim | H01L 27/3272 257/40 |
| 2015/0192814 A1* | 7/2015 | Kosugi | G06F 3/0412 349/12 |
| 2015/0205428 A1* | 7/2015 | Wang | G06F 3/044 345/174 |
| 2015/0206926 A1* | 7/2015 | Hong | H01L 27/322 345/173 |
| 2015/0311477 A1* | 10/2015 | Cho | H01L 51/5284 257/40 |
| 2015/0317023 A1* | 11/2015 | Wei | G06F 3/044 345/174 |
| 2015/0380467 A1* | 12/2015 | Su | H01L 27/323 257/40 |
| 2016/0004369 A1* | 1/2016 | Noguchi | G02F 1/13338 345/174 |
| 2016/0011447 A1* | 1/2016 | Choi | G02F 1/13338 349/12 |
| 2016/0132148 A1* | 5/2016 | Han | G06F 3/044 345/174 |
| 2016/0141547 A1* | 5/2016 | Kim | H01L 51/5246 257/40 |
| 2016/0148562 A1* | 5/2016 | Jung | H01L 51/5246 345/212 |
| 2016/0154499 A1* | 6/2016 | Bae | G06F 3/044 345/174 |
| 2016/0209688 A1* | 7/2016 | Kim | G06F 3/044 |
| 2016/0218151 A1* | 7/2016 | Kwon | H01L 27/323 |
| 2016/0239143 A1* | 8/2016 | Song | G06F 3/0416 |
| 2016/0246427 A1* | 8/2016 | Ming | G06F 3/0412 |
| 2016/0266706 A1* | 9/2016 | Lu | G06F 3/0416 |
| 2017/0010708 A1* | 1/2017 | Lee | G06F 3/044 |
| 2017/0097734 A1* | 4/2017 | Yang | G06F 3/0418 |
| 2017/0160841 A1* | 6/2017 | Lou | G06F 3/044 |

FOREIGN PATENT DOCUMENTS

| | | |
|---|---|---|
| KR | 10-2012-0116225 | 10/2012 |
| KR | 10-2013-0131808 | 12/2013 |
| KR | 10-2015-0064281 | 6/2015 |

* cited by examiner

DISPLAY DEVICE INCLUDING TOUCH SENSING SENSOR

CROSS REFERENCE TO RELATED APPLICATION

This application claims priority from and the benefit of Korean Patent Application No. 10-2014-0169123 filed on Nov. 28, 2014, which is hereby incorporated by reference for all purposes as if fully set forth herein.

BACKGROUND

Field

Exemplary embodiments of the present invention relate to a display device including a touch sensing sensor.

Discussion of the Background

A display device such as a liquid crystal display (LCD), an organic light emitting diode (OLED) display, an electrophoretic display, etc. typically includes a field generating electrode and an electro-optical active layer.

For example, the OLED display may include an organic emission layer as the electro-optical active layer.

The field generating electrode is connected to switching elements such as a thin film transistor and the like to be applied with a data signal, and the electro-optical active layer converts the data signal into an optical signal to display an image.

When a heavy and fragile glass substrate is used in a display panel of the display device, there are some limitations in the portability, size, and weight of the display.

Accordingly, recently, a flexible display device using a plastic substrate, which is light, strong, impact-resistant, and flexible, has been actively developed as a substrate for the display panel.

The display device may include a touch sensor allowing a user to easily interact with the device, in addition to displaying an image.

Touch sensing is used to determine touch information, such as whether an object approaches or contacts a screen, and its touch position by sensing changes in pressure, charges, light, and the like that may be applied to the screen of the display device when a user writes characters or draws figures by approaching or touching the screen using a finger or a touch pen.

The display device may receive an image signal based on the contact information to display an image.

Touch sensing may be implemented by a touch sensing sensor.

The touch sensing sensor may be classified into various types such as a resistive type, a capacitive type, an electromagnetic type (EM), an optical type, etc.

For example, in the resistive type of touch sensor, two electrodes that face each other and are separated from each other may contact each other due to pressure from an external object.

When the two electrodes contact each other, a change in voltage caused by a change in resistance at the touch position may be detected such that the touch position and the like are determined.

The capacitive type of touch sensing sensor includes a sensing capacitor including a plurality of sensing electrodes for transmitting a detection signal, and detects a change in capacitance of the sensing capacitor and/or an amount of charges that is caused when a conductor such as a finger approaches the touch sensing sensor, thereby determining whether or not touch occurs and the touch position.

The capacitive type of touch sensing sensor may include a plurality of touch electrodes disposed in the contact sensing area and signal-transmitting wires connected to the touch electrodes.

The signal-transmitting wires may transmit a sensing input signal to the touch electrodes, or may transmit a sensing output signal of the touch electrodes to a sensing signal controller.

In a flexible display device, the touch sensing sensor may be formed in a separate touch screen panel and may be attached to the flexible display device to be provided as an add-on cell type.

When a touch panel is attached to a display device, processes of manufacturing the touch panel and then attaching the touch panel on the display device may be added, thereby deteriorating yields and increasing cost.

In addition, an adhesive layer may be disposed between the touch panel and the display device or on the touch panel to attach the touch panel on the display device and to fix it thereon, which may cause a thickness of the display device to increase.

Further, the attached touch panel may deteriorate transmittance, increase reflectance, and increase haze.

Further, metal electrodes included in a touch sensing sensor of the touch panel attached to the outside of the display device may corrode to cut off wires.

Further, when a flexible display device attached to the touch panel is bent, its durability may deteriorate to cause defects.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a simplified manufacturing process of the display device including the touch sensing sensor having a reduced cost of manufacture.

Exemplary embodiments of present invention also provide a display device in which the thickness of the display device including the touch sensing sensor is decreased, optical characteristics are improved, and impurities such as moisture and the like are prevented from permeating into the touch sensing sensor, thereby reducing the defects of the touch sensing sensor and enhancing durability of the flexible display device when it is bent.

Additional features of the invention will be set forth in the description which follows, and in part will be apparent from the description, or may be learned by practice of the invention.

An exemplary embodiment of the present invention discloses a display device including: a substrate; a pixel driving circuit disposed in a first region on the substrate; an encapsulation layer disposed on the pixel driving circuit; a touch sensing layer formed on the encapsulation layer and including a touch sensing sensor; and a touch-driving layer including a touch driving circuit disposed in a second region on the substrate, integrally formed with the pixel driving circuit, and connected to the touch sensing sensor to apply a signal thereto.

An exemplary embodiment of the present invention also discloses a manufacturing method of a display device, including: forming a pixel driving circuit in a first region on a substrate and forming a touch driving circuit in a second region on the substrate; forming an encapsulation layer in the first region; and forming a touch sensing layer including a touch sensing sensor connected to the touch driving circuit on the encapsulation layer.

A driving method of a display device according to an exemplary embodiment includes a display unit including a plurality of pixels and a plurality of driving signal lines connected to the plurality of pixels, and a touch sensing sensor formed on the display unit and including a plurality of touch electrodes overlapping at least one of the plurality of driving signal lines, includes: applying a driving signal to at least one driving signal line; and applying the driving signal to the rest of the touch electrodes other than those overlapping the driving signal lines to which the driving signal is applied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
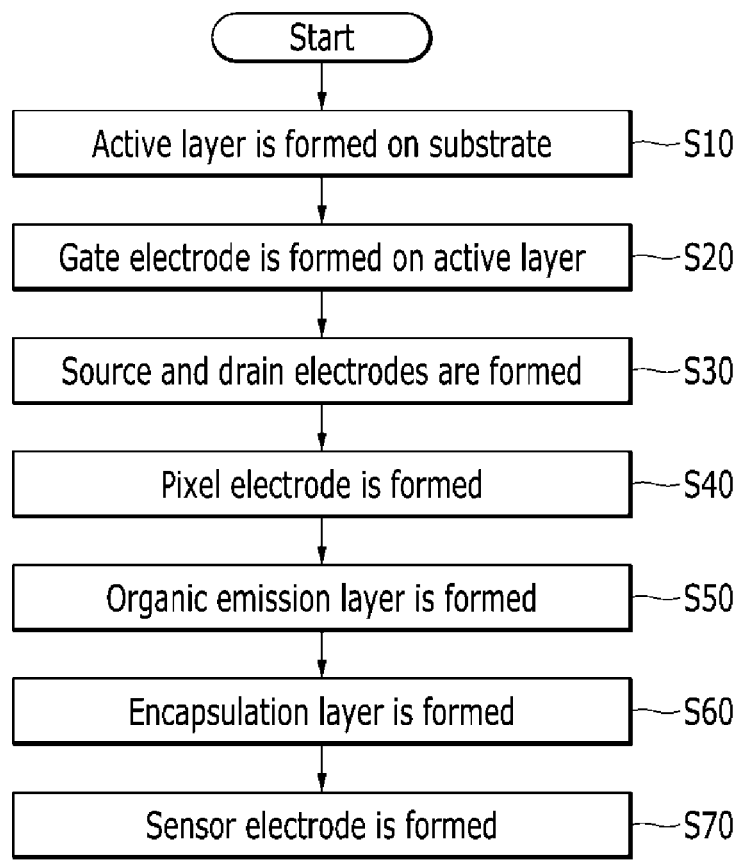
FIG. 1 is a flowchart illustrating a manufacturing method of a flexible display device according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a flowchart for illustrating a manufacturing method of a flexible display device according to an exemplary embodiment.

First, an active layer is formed in display and peripheral areas on a substrate (S10). Specifically, the active layer is formed on the transparent insulating substrate that is formed of glass, quartz, ceramic, plastic, etc. For example, after forming an amorphous silicon layer on the substrate and then forming the amorphous silicon layer as a polysilicon layer, the polysilicon layer may be patterned using a first mask such that the active layer is formed from the polysilicon layer.

Next, a gate electrode is formed on the active layer (S20). Specifically, the gate electrode formed of a conductive material may be formed on the active layer. For example, after forming an insulating layer on the active layer and then forming a gate electrode layer on the insulating layer, the gate electrode layer may be patterned using a second mask such that the gate electrode is formed from the gate electrode layer. Impurities may be injected into the active layer using the gate electrode as a mask, such that channel, source, and drain regions are formed on the active layer. The gate electrode may be formed in the display and the peripheral areas.

Next, source and drain electrodes are formed on the gate electrode (S30). Specifically, the source and drain electrodes may be formed on the gate electrode such that they are respectively connected to the source and drain regions of the active layer.

For example, after forming an insulating layer on the gate electrode and then forming a contact hole for exposing each of the source and drain regions of the active layer using a third mask, a source/drain electrode layer may be formed on the insulating layer formed with the contact hole and is then patterned using a fourth mask, such that each of the source and drain electrodes can be formed from the source/drain electrode layer. For example, the source and drain electrodes may be formed in the display and peripheral areas.

According to the aforementioned processes, thin film transistors (TFTs) including the active layer, the gate electrode, the source electrode, and the drain electrode are manufactured. Specifically, the TFTs forming pixels disposed in the display area and a TX driving unit 414 disposed in the peripheral area may be manufactured.

Second contact wires 421 disposed in the peripheral area are integrally formed when the source and drain electrodes are formed. For example, after forming the source/drain electrode layer on the insulating layer formed in the peripheral area, the source/drain electrode layer may be patterned using the fourth mask to form the second contact wires 421 from the source/drain electrode layer.

Next, an organic insulating layer including an interlayer insulating portion and a pixel definition portion may be formed on the source and drain electrodes. Specifically, the interlayer insulating portion including the contact hole for exposing the drain electrode and the organic insulating layer including a plurality of pixel definition portions, which respectively protrude from the interlayer insulating portion and are spaced apart from each other while interposing the contact hole therebetween, may be formed on the source and drain electrodes. That is, the pixel definition portions and the interlayer insulating portion may be integrally formed.

For example, an organic layer including a photosensitive material may be formed on the source and drain electrodes and is then exposed to light using a fifth mask, which serves as a halftone mask having different transmittances in accordance with the contact hole, the interlayer insulating portion, and the pixel definition portions, and the exposed organic layer may be developed, thereby forming the organic insulating layer including the interlayer insulating portion and the pixel definition portions including the contact hole.

Next, a pixel electrode is formed on the interlayer insulating portion (S40). Specifically, the pixel electrode may be formed on the interlayer insulating portion such that it is connected to the drain electrode through the contact hole. For example, a pixel electrode layer may be formed on the interlayer insulating portion and is then patterned using a sixth mask to form the pixel electrode. The pixel electrode layer may be patterned in the peripheral area to be formed as first contact electrodes.

The first contact electrodes may be connected to the drain electrodes of the TFTs. In this case, the first contact electrodes connected to the drain electrodes of the TFTs of the peripheral area may be connected to touch wires connected to the touch electrodes that are to be formed later.

Next, an organic emission layer is formed on the pixel electrode of the display area (S50). Specifically, the organic emission layer may be deposited on the exposed pixel electrode that is defined by the pixel definition portion. A facing electrode may be formed on the organic emission layer. Specifically, the disc-shaped facing electrode may be formed on the organic emission layer.

According to the aforementioned processes, an organic light emitting diode (OLED) including the pixel electrode, the organic emission layer, and the facing electrode may be formed.

Next, a thin film encapsulation layer is formed on the facing electrode to encapsulate, together with the substrate, the OLED (S60).

Thus, the pixels may be formed in the display area, and the wires connected to the touch electrodes and the TX driving unit 414 may be formed in the peripheral area.

Next, a touch electrode layer including first and second touch electrodes 410 and 420 is formed on the thin film encapsulation layer of the display area (S70). The first touch electrodes 410 may be formed in a first direction, and the second touch electrodes may be formed in a second direction which is different than the first direction.

The first touch electrodes 410 may be formed such that they are connected to the drain electrodes of the TFTs forming the TX driving unit 414 of the peripheral area through the touch wires. The second touch electrodes 420 may be connected to the second contact wires 421 in the peripheral area.

The encapsulation layer may be formed in the display and peripheral areas. Specifically, the encapsulation layer may be further formed on the touch electrode layer of the display area and on the TX driving unit 414 and the second touch wires of the peripheral area.

Next, a display device including a touch sensing sensor according to the exemplary embodiment described in FIG. 1 will now be described with reference to FIGS. 2 to 7.

Figure 2:
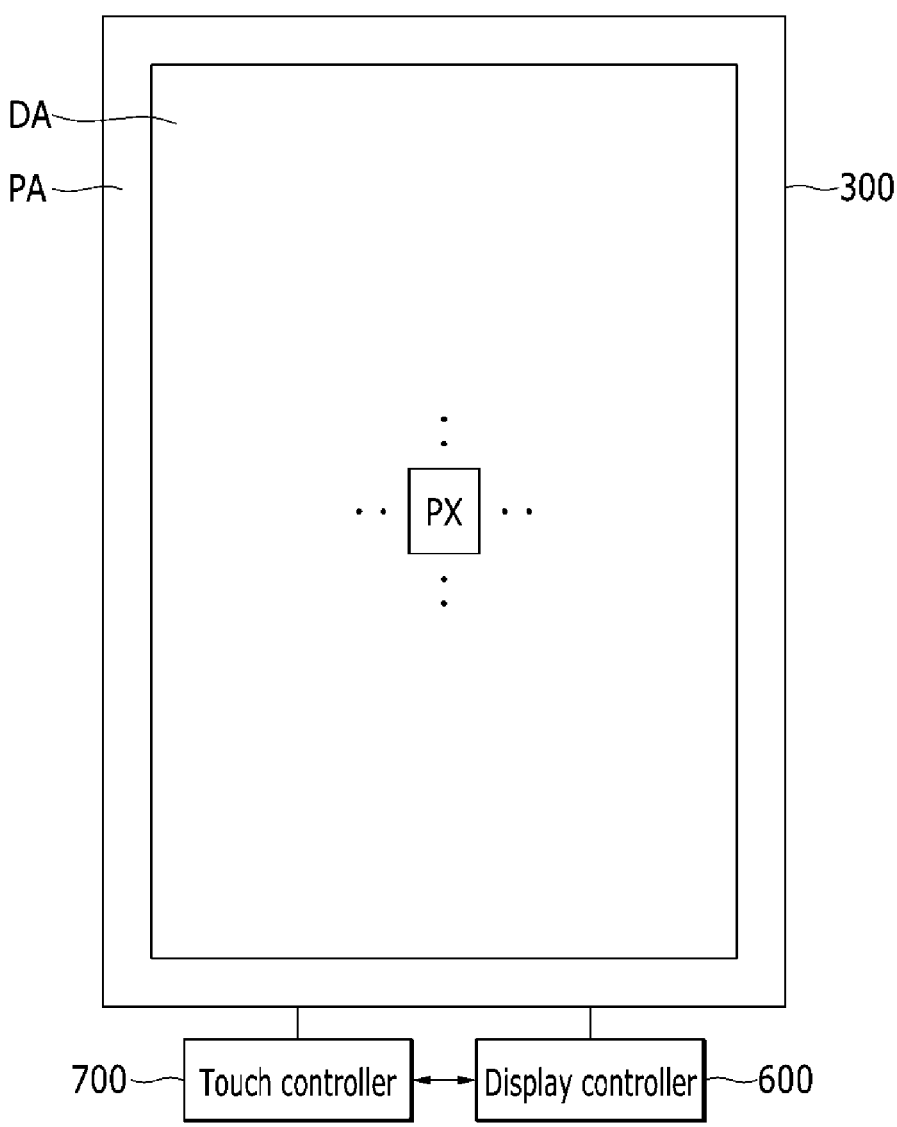
FIG. 2 is a block diagram of the flexible display device according to the exemplary embodiment of FIG. 1.
Figure 3:
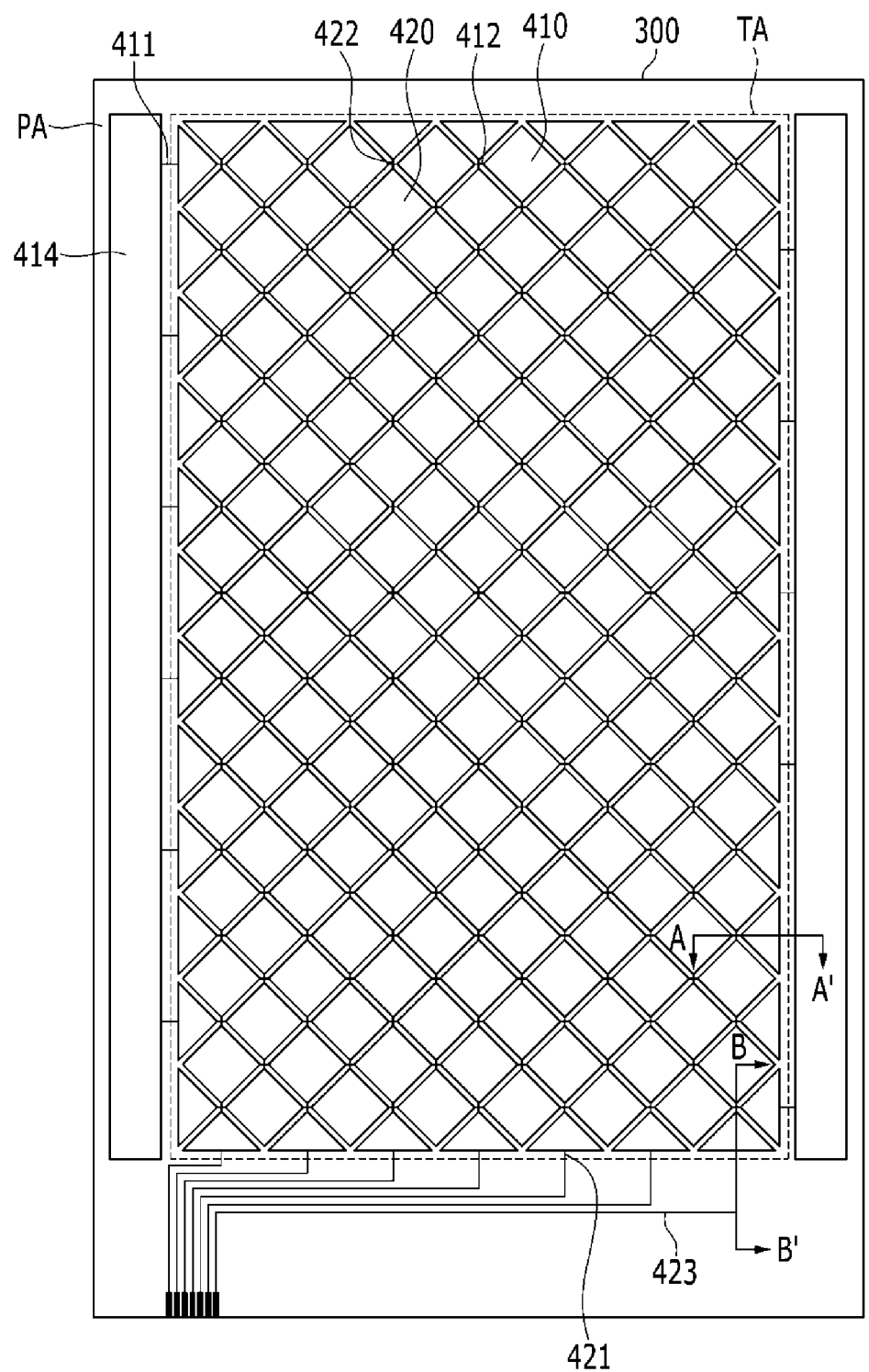
FIG. 3 is a top plan view of a touch sensing sensor of the flexible display device according to the exemplary embodiment of FIG. 2.

FIG. 2 is a block diagram of the flexible display device according to the exemplary embodiment, and FIG. 3 is a top plan view of a touch sensing sensor of the flexible display device according to the exemplary embodiment.

Referring to FIG. 2, the flexible display device according to an exemplary embodiment includes a display panel 300. The flexible display device also includes a display controller 600 and a touch controller 700 that are connected to the display panel 300.

The display panel 300 may display an image and detect a touch. The display panel 300 includes a display area DA for displaying the image and a peripheral area PA around the display area DA.

A partial or entire area of the display panel 300 may be a touch active area TA where the touch can be detected. The touch active area TA is an area where the touch can be detected when an object actually approaches or touches the display panel 300. In this case, the touch refers to a state of an external object approaching the display panel 300 or hovering while it is adjacent to the display panel 300, as well as a state of an external object such as a finger of a user directly contacting the display panel 300.

An example in which the entire display area DA substantially corresponds to the touch active area TA is illustrated for simplicity's sake, but exemplary embodiments of the present invention are not limited thereto.

Some of the peripheral area PA may be used as the touch active area TA, or only some of the display area DA may form the touch active area TA.

Referring to FIG. 2, a plurality of pixels PX and a plurality of display signal lines (not illustrated) connected to the pixels PX to transmit a pixel driving signal are disposed in the display area DA. The display signal lines include a plurality of scan signal lines (not illustrated) for transmitting a scan signal, and a plurality of data lines (not illustrated) for transmitting a data signal. The scan signal lines and the data lines may extend to cross each other. The display signal lines may be extended to the peripheral area PA to form a pad portion (not shown). The plurality of pixels PX may be arranged in an approximate matrix form, but they are not limited thereto.

Each pixel PX may include switching elements (not shown) connected to the gate line and the data line, and a pixel electrode (not shown) connected to the switching elements. The switching elements may be, for example, three-terminal elements such as thin film transistors and the like, that are integrated into the display panel 300.

The switching elements may be turned on or turned off according to the gate signal transmitted through the gate line such that they selectively transmit the data signal transmitted through the data line to the pixel electrode.

The pixel PX may further include a facing electrode (not shown) that faces the pixel electrode.

In an organic light emitting diode (OLED) display, an emission layer may be disposed between the pixel electrode and the facing electrode to form a light-emitting device. The facing electrode may transmit a common voltage.

In order to implement color display, each pixel PX may display one of primary colors, and these primary colors may be mixed to be perceived as a desired color, however exemplary embodiments are not limited thereto. For example, there may be three primary colors such as red, green, and blue. However, for example, four primary colors may be used.

Each pixel PX may be disposed to correspond to each pixel electrode and may further include a color filter for displaying, for example, one of the primary colors, or the emission layer included in the light-emitting device may emit colored light.

The touch sensing sensor is disposed in the touch active area TA. The touch sensing sensor may sense contacts in various ways. For example, the touch sensing sensor may be classified into various types such as a resistive type, a capacitive type, an electromagnetic (EM) type, an optical type, etc. In the present exemplary embodiment, a capacitance type of touch sensing sensor will be exemplarily described for the sake of simplicity.

Referring to FIG. 3, the touch sensing sensor according to the exemplary embodiment includes a plurality of touch electrodes. The plurality of touch electrodes may include the plurality of first touch electrodes 410 and the plurality of second touch electrodes 420. The first and second touch electrodes 410 and 420 are disposed to be separated from each other. For example, the plurality of first and second touch electrodes 410 and 420 may be alternately distributed and disposed in the touch active area TA such that they do not overlap each other. For example, the first touch electrodes 410 may be disposed in plurality along a row direction, and the second touch electrodes 420 may be disposed in plurality along a column direction.

The first and second touch electrodes 410 and 420 may be disposed on the same layer. The first and second touch electrodes 410 and 420 may respectively have a quadrangular shape, but they are not limited thereto, and may have various shapes such as those having a protruding portion and the like for improving sensitivity of the touch sensing sensor.

The plurality of first touch electrodes 410 disposed in the same row or column may be connected to or separated from each other inside or outside the touch active area TA. Similarly, at least some of the plurality of second touch electrodes 420 disposed in the same column or row may be connected to or separated from each other inside or outside the touch active area TA.

For example, as shown in FIG. 3, when the plurality of first touch electrodes 410 disposed in the same row are connected to each other inside the touch active area TA, the plurality of second touch electrodes 420 disposed in the same column may be connected to each other inside the touch active area TA.

The first touch electrodes 410 connected to each other in each row may be connected to the TX driving unit 414 through first contact wires 411, while the second touch electrodes 420 connected to each other in each column may be connected to the touch controller 700 through second contact wires 421.

The first and second contact wires 411 and 421 may be disposed in the peripheral area PA of the display panel 300, as shown in FIG. 3, but alternatively, may be disposed in the touch active area TA. The second contact wires 421 are connected to second touch wires 423 through a second contact electrode 191_3 (shown in FIG. 5), and end portions of second touch wires 423 form a pad portion 450 in the peripheral area PA of the display panel 300.

The first and second touch electrodes 410 and 420 may have a transmittance which allows light from the display panel 300 to pass through them. For example, the first and second touch electrodes 410 and 420 may be made of a thin metal layer such as indium tin oxide (ITO), indium zinc oxide (IZO), silver nanowire (AgNw), etc. or a transparent conductive material such as a metal mesh, carbon nanotubes (CNT), etc., but they are not limited thereto.

The first and second contact wires 411 and 421 may include a transparent conductive material contained in the first and second touch electrodes 410 and 420, and/or a low resistance material such as molybdenum (Mo), silver (Ag), titanium (Ti), copper (Cu), aluminum (Al), and molybdenum/aluminum/molybdenum (Mo/Al/Mo).

The first and second touch electrodes 410 and 420 disposed adjacent to each other form a mutual sensing capacitor that serves as the touch sensing sensor. The mutual sensing capacitor may receive a sensing input signal from either one of the first and second touch electrodes 410 and 420, and may output a variation in an amount of charges caused by contact of the external object as a sensing output signal through the other touch electrodes.

Unlike as shown in FIG. 2, the plurality of first and second touch electrodes 410 and 420 may be disposed separate from each other, and may be respectively connected to the touch controller 700 through the touch wires (not shown). In this case, each touch electrode may form a self-sensing capacitor that serves as the touch sensing sensor.

The self-sensing capacitor may receive the sensing input signal to be charged, and if contact of the external object such as a finger occurs, the amount of charges charged therein may be changed to output the sensing output signal that is different from the received sensing input signal.

Referring back to FIG. 2, the display controller 600 may control an image display operation of the display panel 300. More specifically, the display controller 600 may receive an input image signal containing luminance information of each pixel PX and an input control signal for controlling display of the received input image signal from the outside.

The display controller 600 may process the input image signal based on the input image signal and the input control signal to convert it into an output image signal, and generates control signals such as a gate control signal and a data control signal. The display controller 600 may output the gate control signal to a gate driver (not shown), and may output the data control signal and the output image signal to a data driver (not shown).

Though not illustrated, the data driver may receive the output image signal for one row of pixels PX according to the data control signal, and may select a gray-level voltage corresponding to each output image signal to convert the output image signal into a data voltage, such that the data voltage can be applied to the corresponding data line.

The gate driver may apply a gate-on voltage to the gate line according to the gate control signal to turn the switching elements connected to the gate line on. Then, the data voltage applied to the data line may be applied to the corresponding pixels PX through the turned-on switching elements. When the data voltage is applied to the pixels PX, the pixels PX may display luminance corresponding to the data voltage through various optical conversion elements such as the light-emitting device and the like.

The touch controller 700 is connected to the touch sensing sensor disposed in the touch active area, and controls an operation of the touch sensing sensor. The touch controller 700 may transmit the sensing input signal to the touch sensing sensor, and/or may receive the sensing output signal to process it. The touch controller 700 may process the sensing output signal to generate touch information such as whether the touch occurs or not, a touch position, and the like.

The driving devices such as the data driver, the gate driver, and the display controller 600 may be directly mounted on the display panel 300 as at least one integrated circuit (IC) chip, mounted on a flexible printed circuit film (not shown) to be attached to the display panel 300 as a tape carrier package (TCP), or mounted on a separate printed circuit board (PCB) (not shown). Additionally or alternatively, the driving devices may be integrated into the display panel 300 along with the display signal lines, the switching elements, and the like.

The touch controller 700 may be directly mounted on the display panel 300 as at least one IC chip, mounted on the flexible printed circuit film to be attached to the display panel 300 as the TCP, or mounted on the separate printed circuit board (PCB). The touch controller 700 may be connected to the second contact wires 421 through the pad portion 450 of the display panel 300.

Now, a structure of the flexible display device according to the exemplary embodiment will be described with reference to FIGS. 4 and FIG. 5 along with FIGS. 1 to 3 described above.

Figure 4:
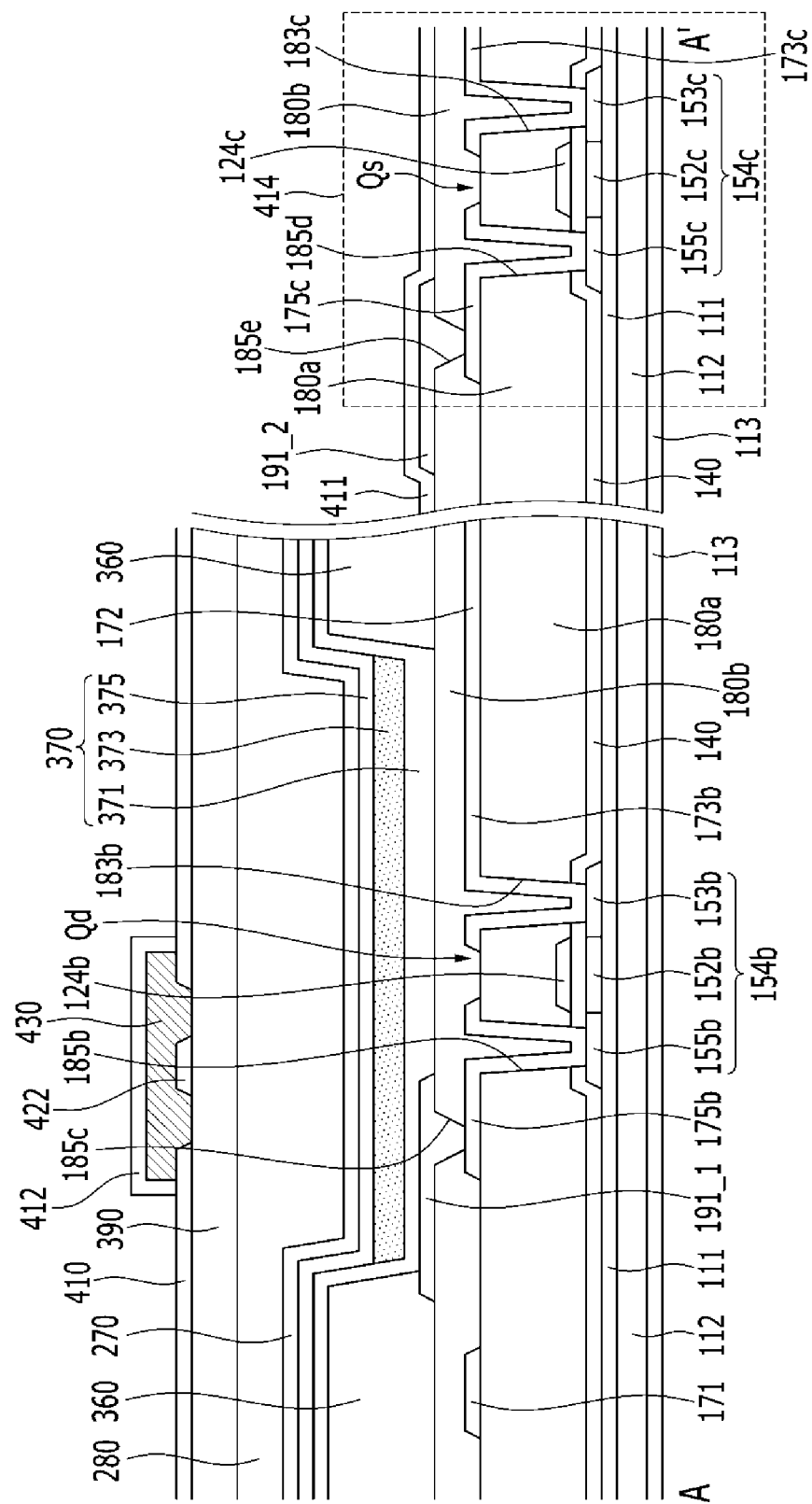
FIG. 4 is a cross-sectional view of a pixel and the touch sensing sensor of the flexible display device taken along the line A-A' of the exemplary embodiment of FIG. 3.
Figure 5:
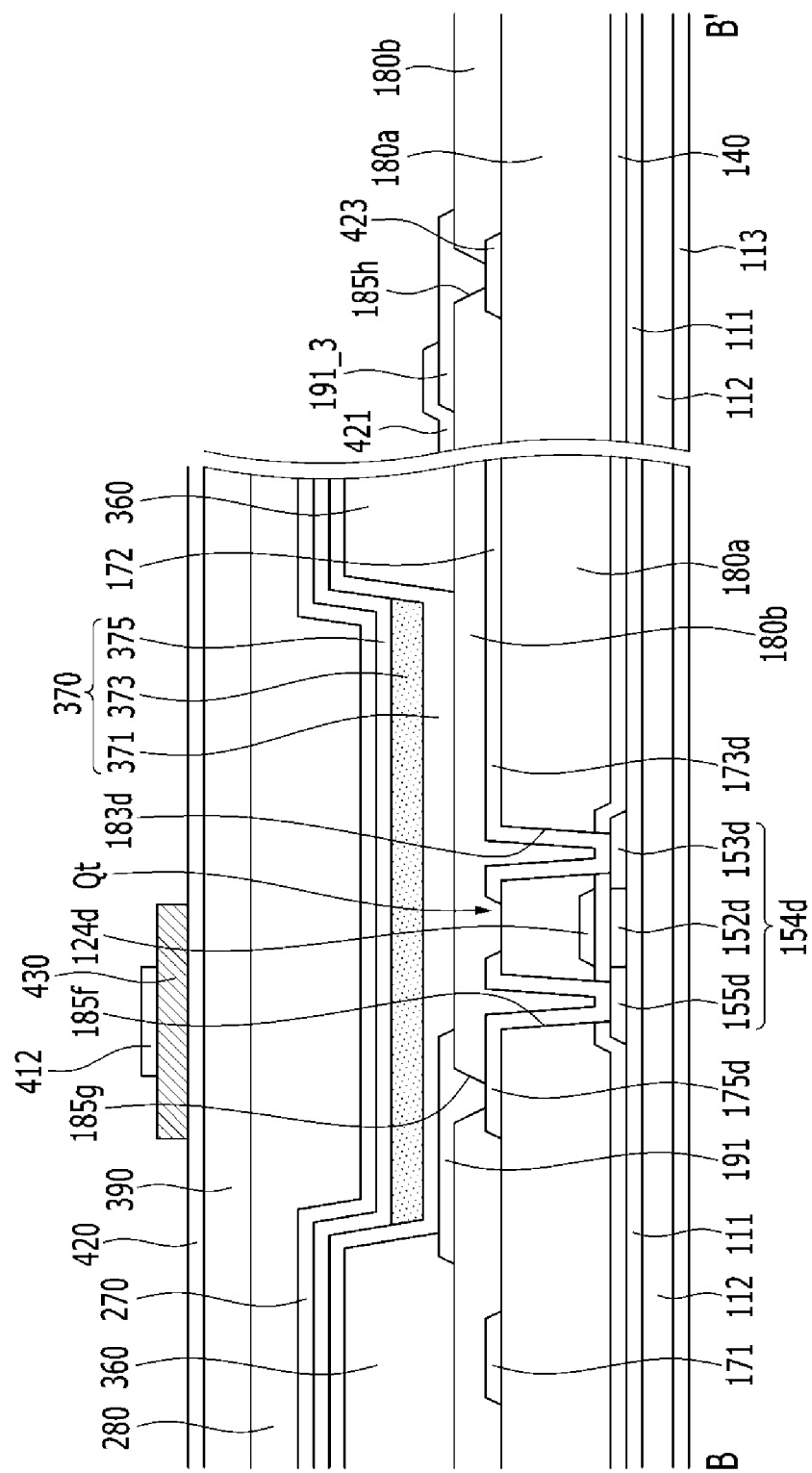
FIG. 5 is a cross-sectional view of the pixel and the touch sensing sensor of the flexible display device taken along the line B-B' of the exemplary embodiment of FIG. 3.

FIG. 4 is a cross-sectional view of the pixel and the touch sensing sensor of the flexible display device taken along the line A-A' of FIG. 3, and FIG. 5 is a cross-sectional view of the pixel and the touch sensing sensor of the flexible display device taken along the line B-B' of FIG. 3.

Referring to FIG. 4, the flexible display device according to the exemplary embodiment may include a flexible substrate, and the flexible substrate may include, for example, various kinds of plastics, thin metal films, or ultra-thin glasses. The flexible substrate according to the present exemplary embodiment may include at least one plastic film. For example, the plastic film may include polyethylene terephthalate (PET), polyethylene naphthalate (PEN), polycarbonate (PC), polyarylate (PAR), polyether imide (PEI), polyether sulfone (PES), or polyimide (PI).

FIG. 4 illustrates an example in which the flexible substrate includes a first film 112 and a second film 113.

For example, the first film 112 may include polyimide (PI) having high moisture resistance and the second film 113 may include polyethylene terephthalate (PET) as a base film.

The first film 112 is disposed on the second film 113. The second film 113 may be omitted.

A barrier layer 111 is disposed on the first film 112. The barrier layer 111 may serve to prevent external impurities from penetrating through and on the flexible substrate, and may have a smooth surface. The barrier layer 111 may include at least one of an inorganic layer and an organic layer. For example, the barrier layer 111 may include a silicon nitride ($SiN_x$), a silicon oxide ($SiO_x$), a silicon oxynitride ($SiO_xN_y$), etc. The barrier layer 111 may be omitted.

A display element including a plurality of thin films is disposed on the barrier layer 111 of the display area DA, and the TX driving unit 414 including a plurality of thin films and the second touch wires 423, are disposed on the barrier layer 111 of the peripheral area PA. The display element includes the various signal lines, the wires, and the plurality of pixels PX that are described above. The signal lines may include the plurality of scan signal lines for transmitting the scan signal and the plurality of data lines for transmitting the data signal.

As an example, a structure of the display element will be described. However, other configurations are possible. A plurality of semiconductors 154b is disposed on the barrier layer 111.

The semiconductor 154b may include a channel region 152b, and source and drain regions 153b and 155b that are formed by doping to be disposed at opposite lateral sides of the channel region 152b. The semiconductor 154b may include amorphous silicon, polysilicon, or an oxide semiconductor.

A gate insulating layer 140 that can be formed of a silicon nitride ($SiN_x$), a silicon oxide ($SiO_x$), or the like is disposed on the semiconductor 154b.

A plurality of gate conductors including the plurality of scan signal lines (not shown) and a control electrode 124b are disposed on the gate insulating layer 140. The control electrode 124b may overlap some of the semiconductor 154b, particularly, in the channel region 152b thereof.

A first passivation layer 180a is disposed on the gate insulating layer 140 and on the gate conductors. The first passivation layer 180a and the gate insulating layer 140 may include a contact hole 183b for exposing the source region 153b of the semiconductor 154b and a contact hole 185b for exposing the drain region 155b thereof.

A plurality of data conductors including a plurality of data lines 171, a plurality of input electrodes 173b, and a plurality of output electrodes 175b are disposed on the first passivation layer 180a.

Each data line 171 may transmit the data signal and cross the scan signal line. The input electrodes 173b are connected to the data lines 171. The output electrodes 175b may have an island-like shape, and may be separated from the data line 171. The input and output electrodes 173b and 175b face each other on the semiconductor 154b. The input and output electrodes 173b and 175b may be connected to the source and drain regions 153b and 155b of the semiconductor 154b through the contact holes 183b and 185b, respectively. The control electrode 124b, the input electrode 173b, and the output electrode 175b form a driving thin film transistor Qd along with the semiconductor 154b. However, a structure of the driving thin film transistor Qd is not limited thereto, and it may be modified in various ways.

A second passivation layer 180b may be formed of an inorganic insulating material such as a silicon nitride or a silicon oxide and may be disposed on the data conductors. The second passivation layer 180b may have a smooth surface such that a light-emitting member to be formed thereon has improved luminous efficiency. The second passivation layer 180b may have a contact hole 185c for exposing the output electrode 175b.

A plurality of pixels electrodes 191_1 is disposed on the second passivation layer 180b. The pixel electrodes 191_1 of each pixel PX may be physically and electrically connected to the output electrode 175b through the contact hole 185c of the second passivation layer 180b. Each pixel electrode 191_1 may include a semi-transmissive conductive material or a transflective conductive material.

A pixel definition layer 360 (referred to as a partition wall) for exposing the pixel electrode 191_1 and having a plurality of openings may be disposed on the second passivation layer 180b. The openings of the pixel definition layer 360 through which the pixel electrodes 191_1 are exposed may define each pixel area. The pixel definition layer 360 may be omitted.

A light-emitting member 370 is disposed on the pixel definition layer 360 and the pixel electrode 191_1. The light-emitting member 370 may include a first organic common layer 371, a plurality of emission layers 373, and a second organic common layer 375 that are sequentially laminated. For example, the first organic common layer 371 may include at least one of a hole injecting layer and a hole transport layer that are sequentially laminated.

The first organic common layer 371 may be formed across the entire display area DA where the pixels PX are disposed, or may be formed only in each pixel PX area.

Each emission layer 373 may be disposed on the pixel electrode 191_1 of the corresponding pixel PX. The emission layer 373 may be formed of, for example, an organic material which uniquely emits light of the primary colors such as red, green, and blue, and may have a structure in which a plurality of organic material layers emitting light of different colors are laminated.

For example, the second organic common layer 375 may include at least one of an electron transport layer and an electron injecting layer. The second organic common layer 375 may be formed across the entire display area DA where the pixels PX are disposed, or may be formed only in each pixel PX area. The first and second organic common layers 371 and 375 are provided to improve luminous efficiency of the emission layer 373, and either one of the first and second organic common layers 371 and 375 may be omitted.

A facing electrode 270 is disposed on the light-emitting member 370 to transmit the common voltage. The facing electrode 270 may include a transparent conductive material. For example, the facing electrode 270 may be formed of a transparent conductive material, or may be formed to have a light-transmitting property by thinly laminating a metal such as calcium (Ca), barium (Ba), magnesium (Mg), aluminum (Al), silver (Ag), etc.

The pixel electrode 191_1, the light-emitting member 370, and the facing electrode 270 of each pixel PX form the light-emitting device, and one of the pixel electrode 191_1 and the facing electrode 270 becomes a cathode while the other becomes an anode.

The flexible display device according to the exemplary embodiment may be a top emission type in which an image is displayed by emitting internal light upward from the light-emitting member 370, but is not limited thereto.

An encapsulation layer 280 may be disposed on the facing electrode 270. The encapsulation layer 280 encapsulates the light-emitting member 370 and the facing electrode 270 and may prevent permeation of moisture and/or oxygen. The encapsulation layer 280 may include a plurality of encapsulating thin films. The first touch electrodes 410 arranged in the first direction and the second touch electrodes 420 arranged in the second direction may be disposed on the encapsulation layer 280. The first touch electrodes 410 may be separated from each other, and may be connected to first connecting portions.

A structure of the first and second touch electrodes 410 and 420 will be described with reference to FIGS. 6 and 7.

Figure 6:
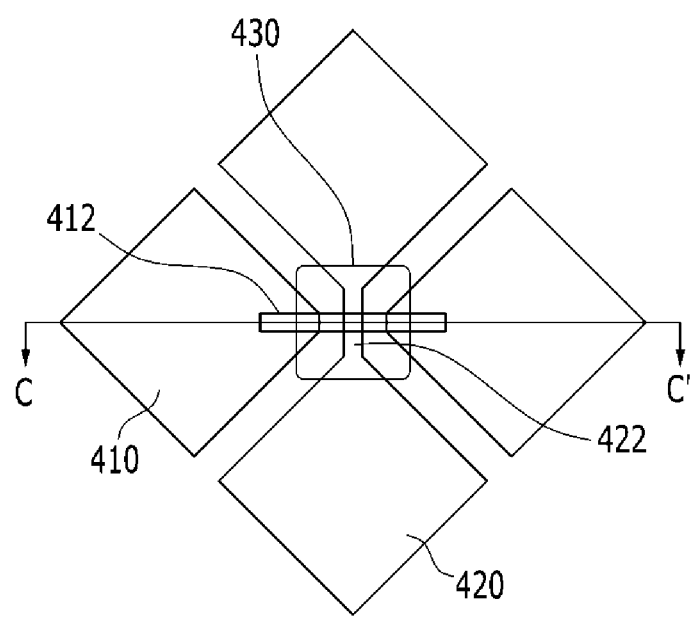
FIG. 6 is a partial enlarged view of the touch sensing sensor illustrated in FIG. 2.
Figure 7:
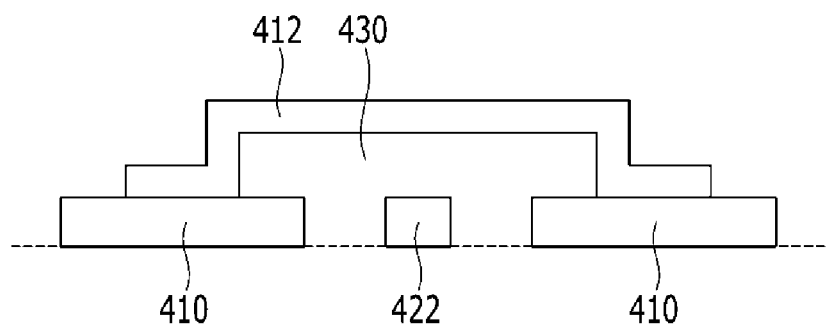
FIG. 7 is a cross-sectional view of the touch sensing sensor illustrated in FIG. 6 taken along the line C-C' of FIG. 6.

FIG. 6 is a partial enlarged view of the touch sensing sensor illustrated in FIG. 2, and FIG. 7 is a cross-sectional view of the touch sensing sensor illustrated in FIG. 6 taken along the line C-C'.

Referring to FIGS. 6 and 7, the plurality of first touch electrodes 410 disposed in each row may be connected to each other through first connecting portions 412, while the plurality of second touch electrodes 420 disposed in each column may be connected to each other through second connecting portions 422. The first connecting portions 412 for interconnecting the adjacent first touch electrodes 410 may be disposed on a layer different from that of the first touch electrodes 410. That is, the first touch electrodes 410 and the first connecting portions 412 may be separated from each other such that they are separately patterned.

The first touch electrodes 410 and the first connecting portions 412 may directly contact each other in order to be connected to each other.

The second connecting portions 422 for interconnecting between the adjacent second touch electrodes 420 are disposed on the same layer as the second touch electrodes 420, and may be formed of the same material as the second touch electrodes 420. That is, the second touch electrodes 420 and the second connecting portions 422 may be integrally formed to be simultaneously patterned.

An insulating layer 430 is disposed between the first and second connecting portions 412 and 422 to insulate the first connecting portions 412 from the second connecting portions 422. As shown in FIGS. 6 and 7, the insulating layer 430 may be a plurality of separate island-like insulators that are disposed at every intersection of the first and second connecting portions 412 and 422. The insulating layer 430 may at least partially expose the first touch electrodes 410 such that the first connecting portions 412 are connected to the first touch electrodes 410. The insulating layer 430 may have round corners or a polygonal shape, but is not limited thereto.

For example, according to another exemplary embodiment, an insulating layer 430 may be formed on an entire surface, and the insulating layer 430 disposed on some of second touch electrodes 420 may be removed to interconnect the second touch electrodes 420 that are adjacent to each other in a column direction. In this case, unlike as shown in FIGS. 6 and 7, first connecting portions 412 for interconnecting between the adjacent first touch electrodes 410 are disposed on the same layer as the first touch electrodes 410 and are integrally formed with the first touch electrodes 410, and second connecting portions 422 for interconnecting between the adjacent second touch electrodes 420 may be disposed on a layer different from that of the second touch electrodes 420.

Next, referring back to FIG. 4, the TX driving unit 414 is connected to the first touch electrodes 410 described above, and includes at least one TX thin film transistor Qs. In FIG. 4, only one thin film transistor is illustrated, but the TX driving unit 414 may include a plurality of thin film transistor Qs.

An exemplary structure of the TX thin film transistor Qs will be described. A plurality of semiconductors 154*c* is disposed on the barrier layer 111. Each semiconductor 154*c* may include a channel region 152*c*, and source and drain regions 153*c* and 155*c* that are formed by doping to be disposed at opposite lateral sides of the channel region 152*c*. The semiconductor 154*c* may include, for example, amorphous silicon, polysilicon, or an oxide semiconductor.

A gate insulating layer 140 that can be formed of a silicon nitride (SiNx), a silicon oxide (SiOx), or the like is disposed on the semiconductor 154*c*. A plurality of gate conductors including a control electrode 124*c* is disposed on the gate insulating layer 140.

The control electrode 124*c* may overlap some of the semiconductor 154*c*, particularly, the channel region 152*c* thereof.

A first passivation layer 180*a* is disposed on the gate insulating layer 140 and the gate conductors. The first passivation layer 180*a* and the gate insulating layer 140 may include a contact hole 183*c* for exposing the source region 153*c* of the semiconductor 154*b*, and a contact hole 185*d* for exposing the drain region 155*c*.

A plurality of data conductors including a plurality of input and output electrodes 173*b* and 175*b* is disposed on the first passivation layer 180*a*. The input and output electrodes 173*c* and 175*c* may be connected to the source and drain regions 153*c* and 155*c* of the semiconductor 154*c* through the contact holes 183*c* and 185*d*, respectively.

The control electrode 124*c*, the input electrode 173*c*, and the output electrode 175*c* form a driving thin film transistor Qs along with the semiconductor 154*c*. However, a structure of the driving thin film transistor Qs is not limited thereto, and it may be modified in various ways.

A second passivation layer 180*b* that can be formed of an inorganic insulating material such as a silicon nitride or a silicon oxide may be disposed on the data conductors. The second passivation layer 180*b* may have a smooth surface. The second passivation layer 180*b* may have a contact hole 185*e* for exposing the output electrode 175*c*.

A plurality of first contact electrodes 191_2 is formed on the second passivation layer 180*b*. The plurality of first contact electrodes 191_2 is physically and electrically connected to the output electrode 175*c* through the contact hole 185*e* of the second passivation layer 180*b*. The plurality of first contact electrodes 191_2 may include a semi-transmissive conductive material or a transflective conductive material. First contact wires 411 connected to the first touch electrodes 410 are formed on the first contact electrode 191_2.

Referring to FIG. 5, second contact wires 421 are formed on a second contact electrode 191_3. The second contact wires 421 are formed on the same layer as the second touch electrodes 420 such that they are connected to the second touch electrodes 420. The second contact electrode 191_3 is connected to second touch wires 423, and end portions of the second touch wires 423 are formed as a pad portion.

As an example, a structure of the second touch wires 423, the second contact wires 421, and the second contact electrode 191_3 will be described. A gate insulating layer 140 may be formed of a silicon nitride (SiNx), a silicon oxide (SiOx), or the like, and is disposed on the barrier layer 111.

A first passivation layer 180*a* is disposed on the gate insulating layer 140.

A plurality of data conductors including second touch wires 423 are disposed on the first passivation layer 180*a* and the gate insulating layer 140.

A second passivation layer 180*b* that can be formed of an inorganic insulating material such as a silicon nitride or a silicon oxide may be disposed on the data conductors. The second passivation layer 180*b* may have a smooth surface. The second passivation layer 180*b* may have a contact hole 185*h* for exposing the second touch wires 423.

Second contact electrodes 191_3 are disposed on the second passivation layer 180*b*. A plurality of second contact electrodes 191_3 is physically and electrically connected to the second touch wires 423 through the contact hole 185*h* of the second passivation layer 180*b*. The plurality of second contact electrodes 191_3 may include a semi-transmissive conductive material or a transflective conductive material.

Second contact wires 421 are formed on the second contact electrodes 191_3 such that they are connected to the second touch electrodes 420.

The transistors Qd and Qt illustrated in the display area DA of FIGS. 4 and 5 are exemplary of the different transistors that are included in the pixel driving circuit. The transistor Qs illustrated in the peripheral area PA is exemplary of the transistor that is included in the TX driving unit 414.

A manufacturing method of a touch sensing layer of a flexible display device according to an exemplary embodiment will now be described with reference to FIGS. 8 to 12 along with the aforementioned drawings.

FIGS. 8 to 12 are top plan views sequentially illustrating a manufacturing process of forming a touch sensing sensor above or below a base film of the flexible display device according to the exemplary embodiment.

Figure 8:
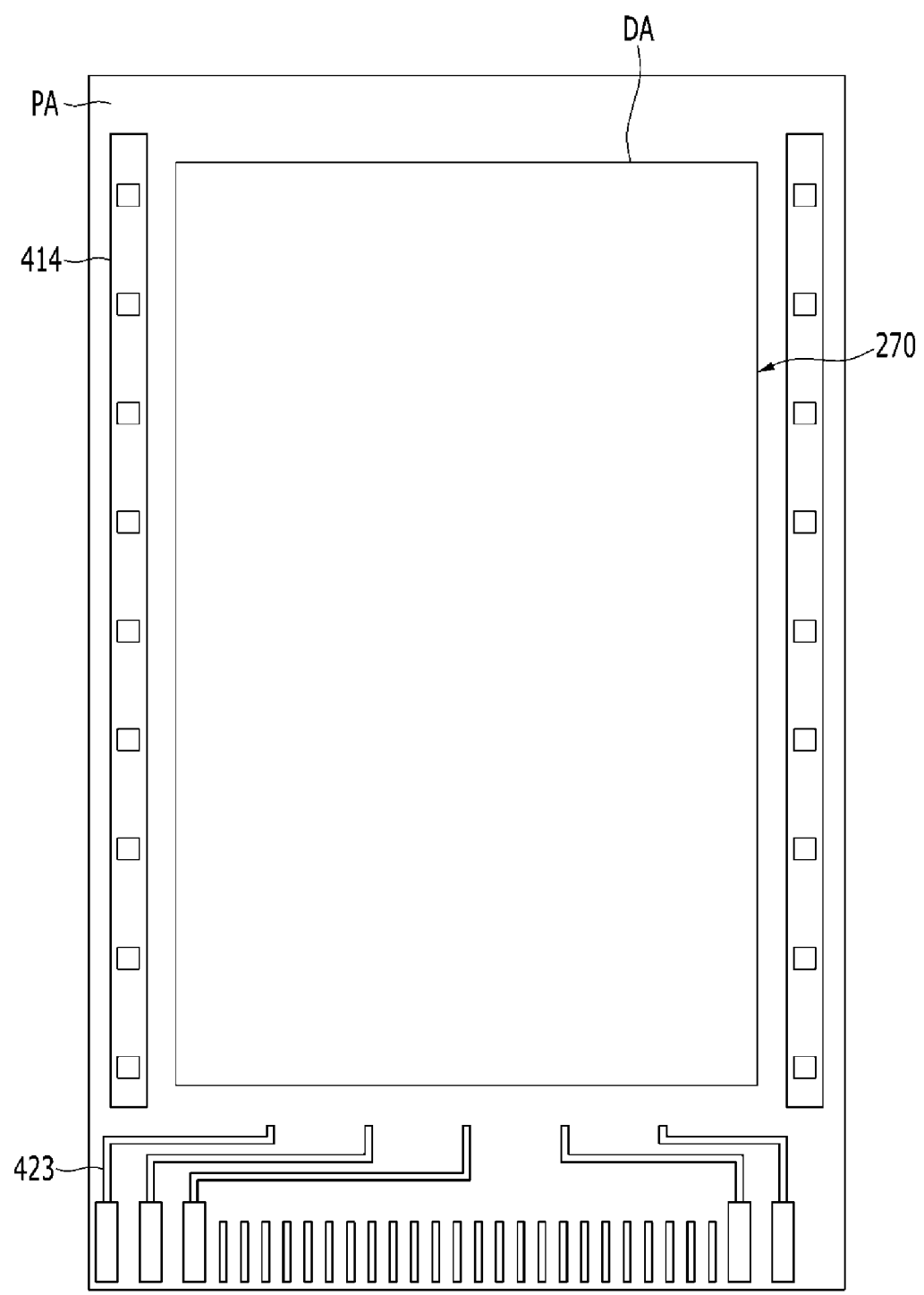
FIGS. 8, 9, 10, 11, and 12 are top plan views sequentially illustrating a manufacturing process of forming a touch sensing sensor above or below a base film of the flexible display device according to an exemplary embodiment.

As shown in FIG. 8, a facing electrode 270 may be formed in a display area DA, and a TX driving unit 414, a second contact electrode 191_3 (shown in FIG. 5), second touch wires 423, and the like may be formed in a peripheral area PA.

Figure 9:
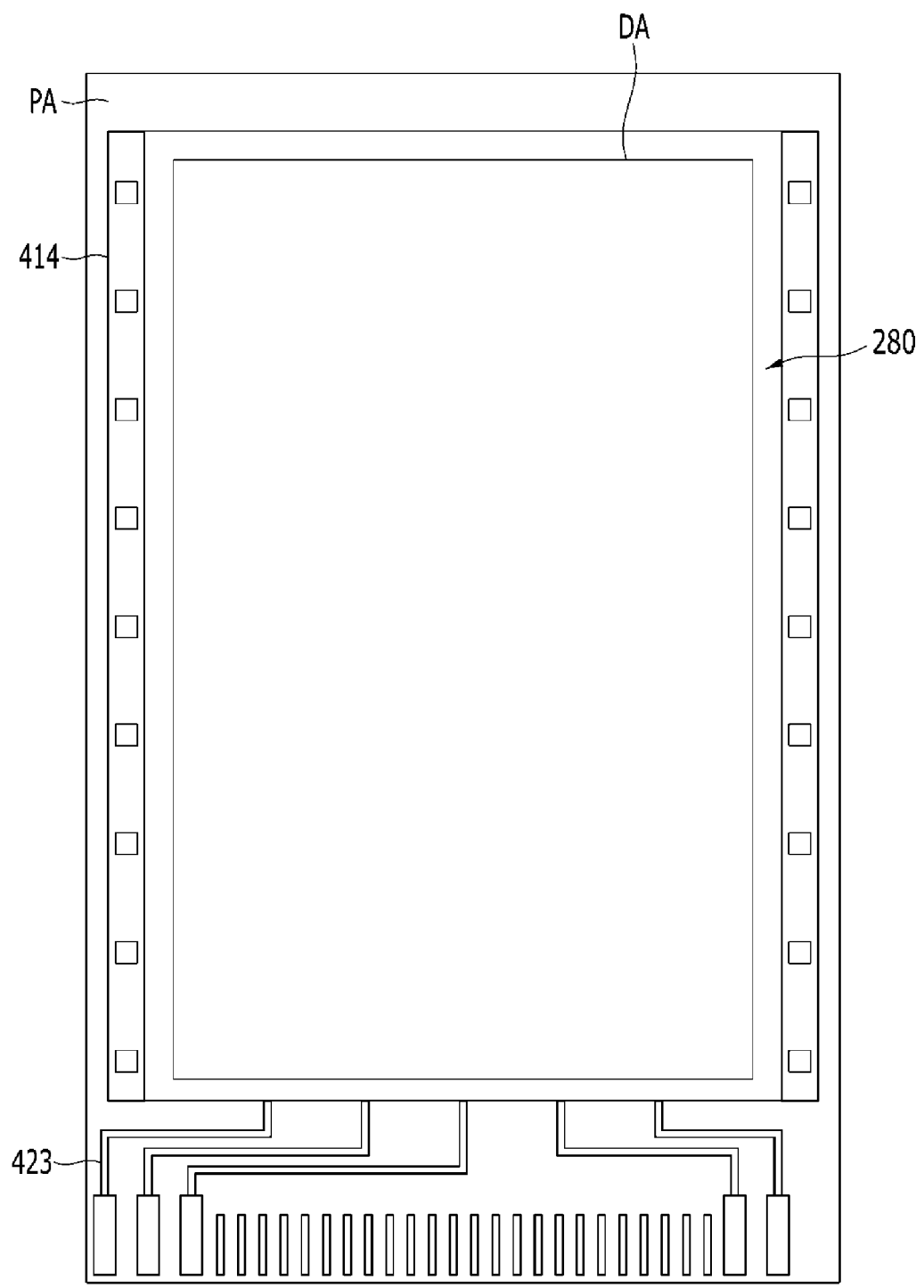

As shown in FIG. 9, an encapsulation layer 280 is formed in accordance with the display area DA.

The encapsulation layer 280 is formed in the rest of the display area DA where the TX driving unit 414 of the peripheral area PA, the second contact electrode 191_3 (shown in FIG. 5), and the second touch wires 423 are not formed since they are connected to touch electrodes that are formed on the encapsulation layer 280.

Figure 10:
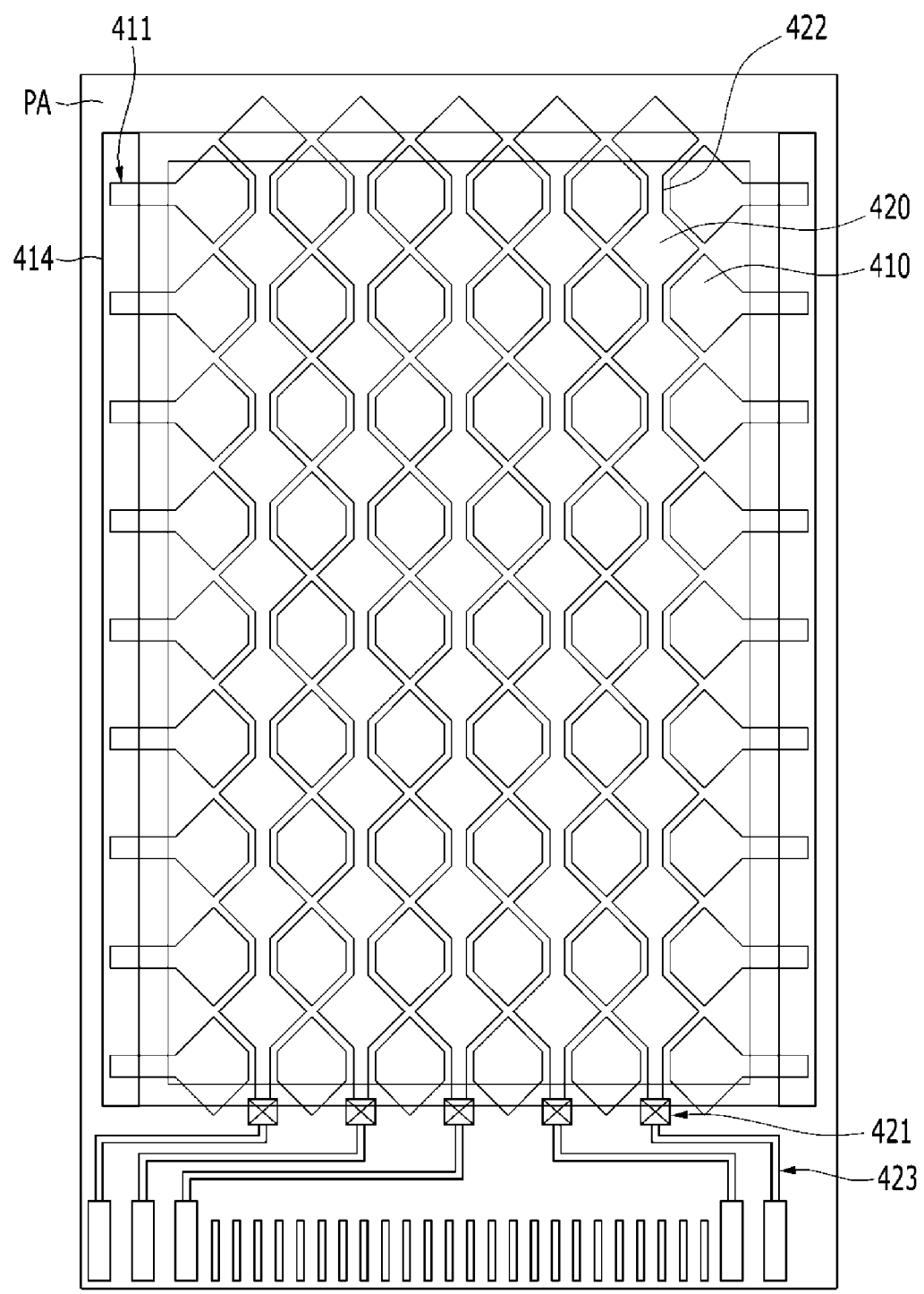

Next, as shown in FIG. 10, first touch electrodes 410, second touch electrodes 420, first contact wires 411, and second contact wires 421 are formed on the encapsulation layer 280.

The first touch electrodes 410 are connected to a TX driving unit 414 through the first contact wires 411, and the second touch electrodes 420 are connected to a second contact electrode 191_3 (shown in FIG. 5) through the second contact wires 421. The first touch electrodes 410 and the first contact wires 411 may be formed on the same layer, and the second touch electrodes 420 and the second contact wires 421 may be formed on the same layer.

Figure 11:
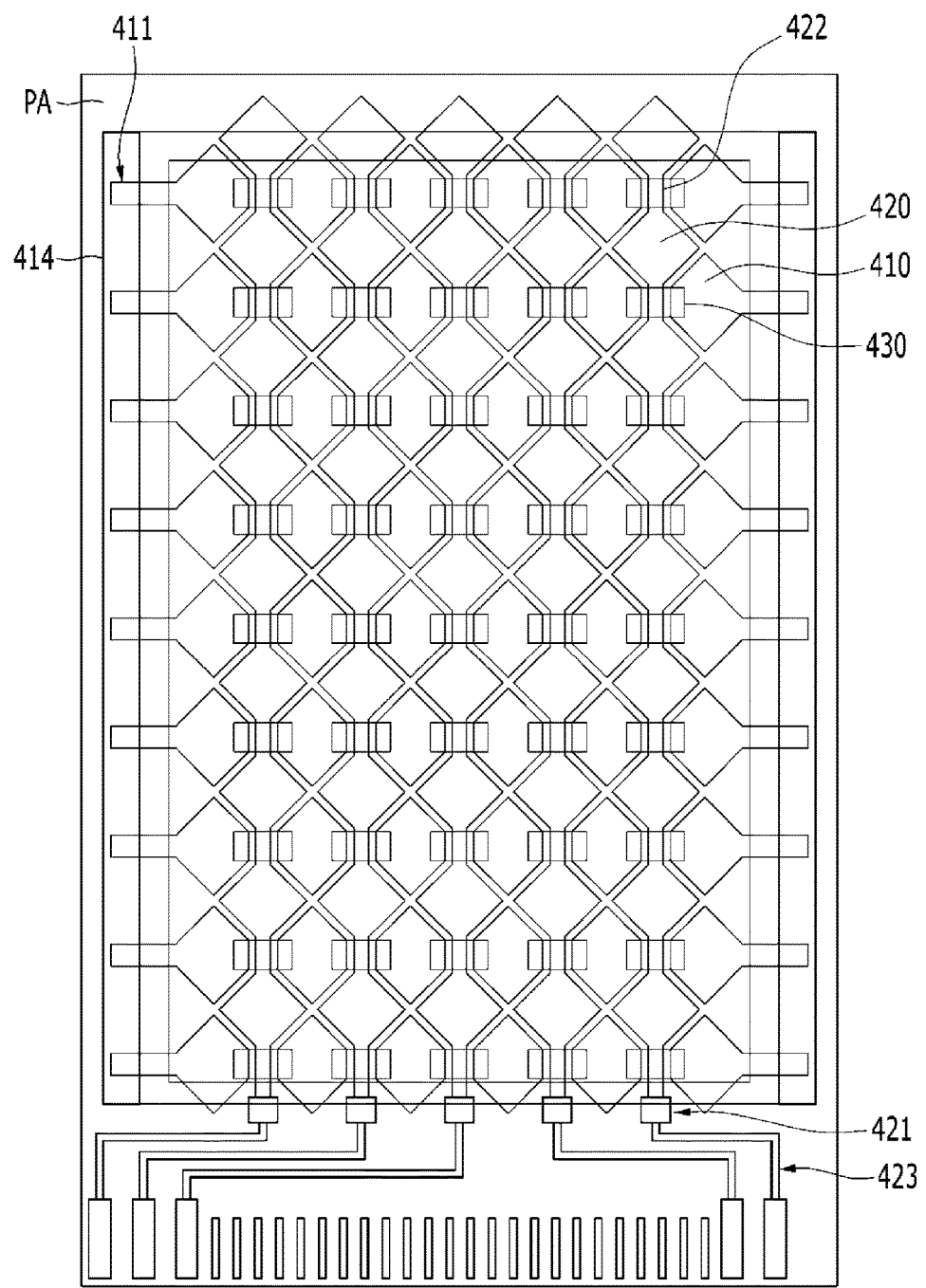

As shown in FIG. 11, an inorganic insulating material such as $SiO_2$ or the like is coated on all of the touch electrodes, and the inorganic insulating material is formed as an insulating layer 430 including contact holes for exposing the first touch electrodes 410 by using photolithography and wet etching processes using masks.

Figure 12:
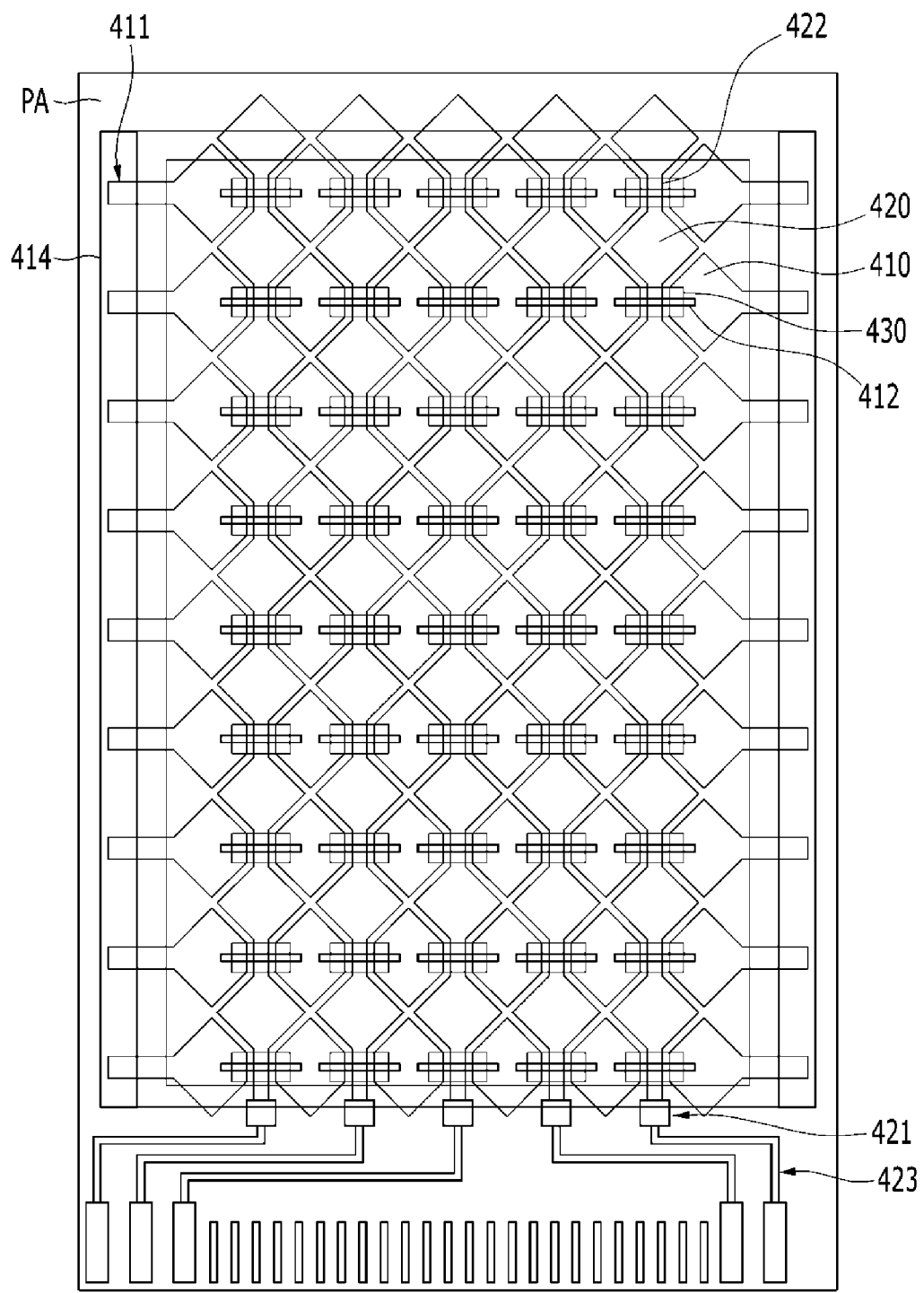

As shown in FIG. 12, first connecting portions are formed on the first touch electrodes 410 that are formed with the insulating layer 430 including the contact holes.

Opposite ends of one first connecting portion may contact the different first touch electrodes 410, and a portion therebetween may contact the insulating layer 430 having the island-like shape, thereby forming a bridge for interconnecting the two first touch electrodes 410. As the first connecting portions are formed, the first touch electrodes 410 are connected to each other.

Next, a driving method according to arrangement of a plurality of pixels PX, a plurality of scan signal lines connected to the pixels PX to transmit a driving signal, and first touch electrodes 410 connected to a TX driving unit 414 will be described with reference to FIGS. 13 and 14.

Figure 13:
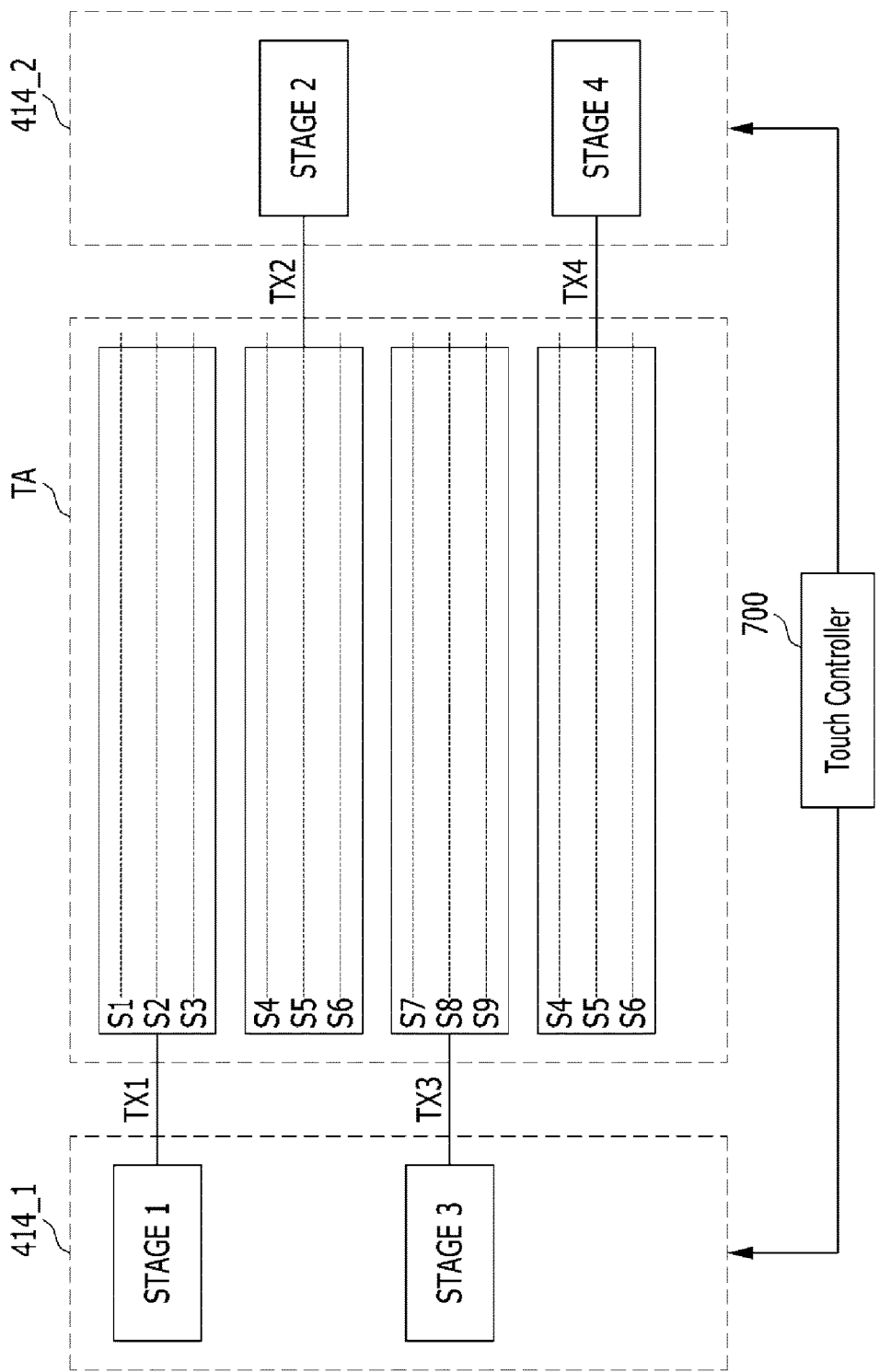
FIG. 13 illustrates scan signal lines and first touch electrodes of the flexible display device according to an exemplary embodiment.
Figure 14:
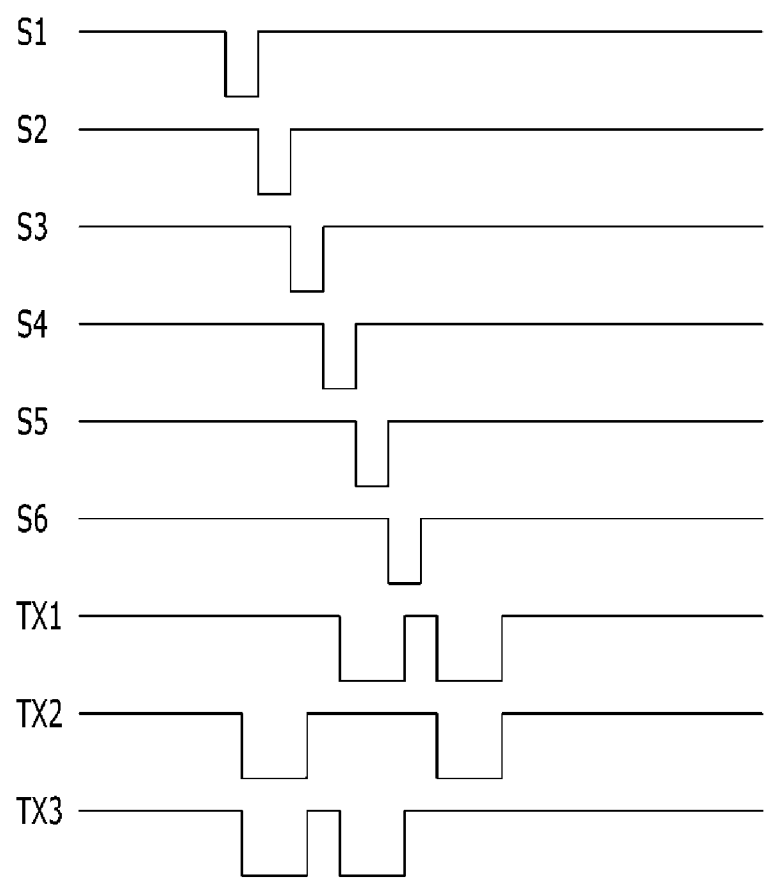
FIG. 14 is a timing diagram illustrating a driving method of a flexible display device according to an exemplary embodiment.

FIG. 13 exemplarily illustrates scan signal lines and first touch electrodes of the flexible display device according to the exemplary embodiment, and FIG. 14 is a timing diagram illustrating a driving method of the flexible display device according to the exemplary embodiment.

As shown in FIG. 13, the scan signal lines (S1, S2, S2, . . . ) may be formed in a first direction toward which the first touch electrodes 410 are formed.

An enable-level scan signal from a scan driver (not shown) may be transmitted to the pixels through the scan signal lines. The scan signal may be sequentially transmitted to all or some of the scan signal lines.

The TX driving unit 414 may include a plurality of stages, and each stage may output a TX driving signal to the corresponding first touch electrodes 410. The TX driving unit 414 may be connected to a touch controller 700 to output the TX driving signal according to a signal that is outputted from the touch controller 700.

In this case, the first touch electrodes 410 and the scan signal lines may overlap each other, so the scan signal transmitted to the overlapped scan signal lines may cause noise in the TX driving signal transmitted to the first touch electrodes 410.

First to third scan signal lines S1 to S3 may overlap the first touch electrodes 410 to which a first TX driving signal TX1 is applied, and fourth to sixth scan signal lines S4 to S6 may overlap second touch electrodes 420 to which a second TX driving signal TX2 is applied.

As shown in FIG. 14, when the enable-level scan signal is sequentially applied to the first to third scan signal lines S1 to S3, the TX driving signal may be applied to the rest of the first touch electrodes 410 other than those to which the first TX driving signal TX1 is applied. When the enable-level scan signal is sequentially applied to the fourth to sixth scan signal lines S4 to S6, the TX driving signal may be applied to the rest of the first touch electrodes 410 other than those to which the second driving signal TX2 is applied.

Accordingly, according to the driving method of the flexible display device according to the exemplary embodiment, the noise of the touch driving signal generated by the driving signal transmitted to the pixels transmitted to the pixels may be reduced.

Figure 15:
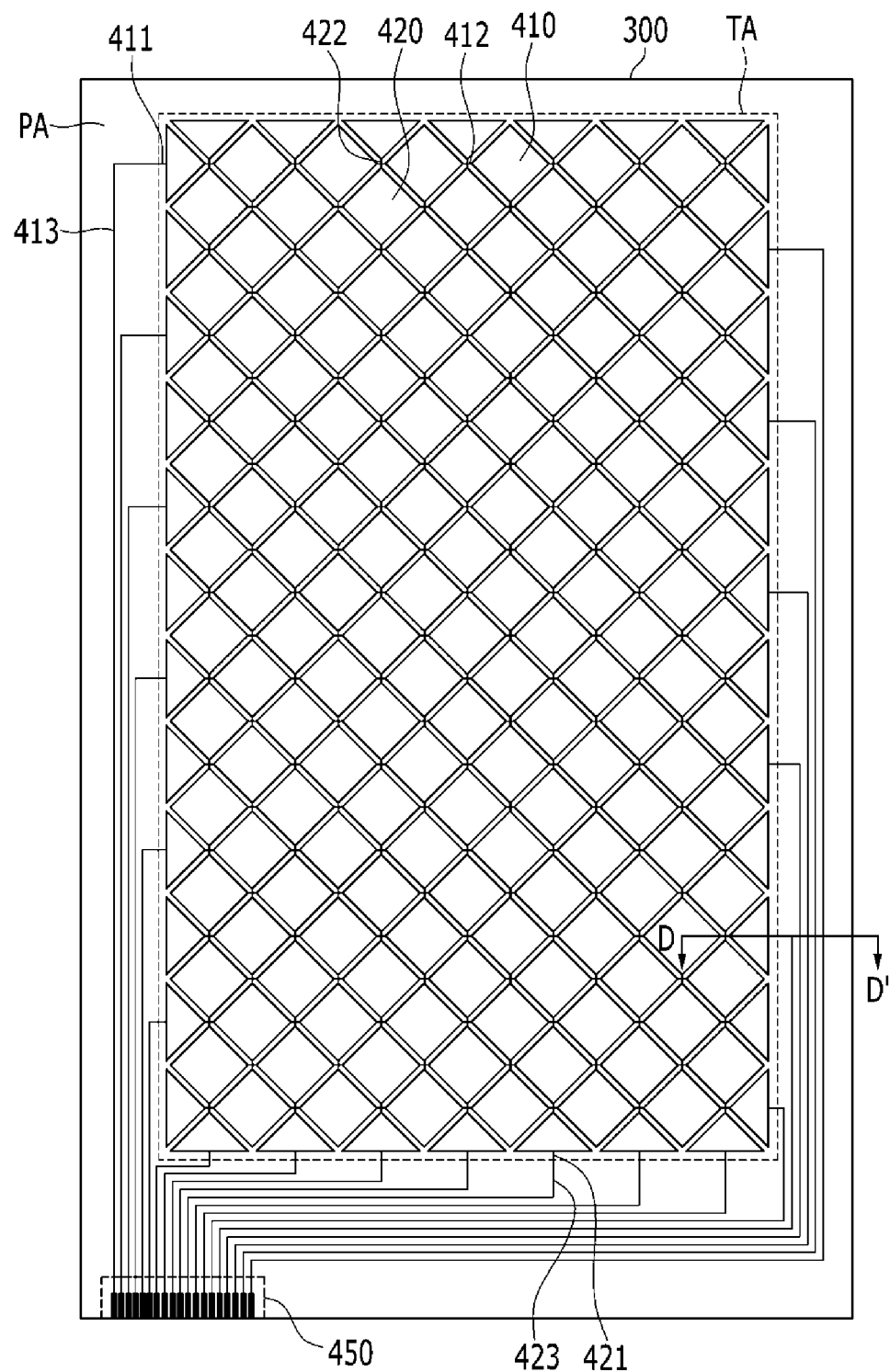
FIG. 15 is a top plan view of a touch sensing sensor of a flexible display device according to another exemplary embodiment.

Next, a flexible display device according to another exemplary embodiment will be described with reference to FIGS. 15 and 16. FIG. 15 is a top plan view of a touch sensing sensor of a flexible display device according to the current exemplary embodiment.

As shown in FIG. 15, the touch sensing sensor according to the current exemplary embodiment may include a plurality of touch electrodes, and the plurality of touch electrodes may include a plurality of first touch electrodes 410 and a plurality of second touch electrodes 420. The first and second touch electrodes 410 and 420 are disposed to be separated from each other.

The first touch electrodes 410 connected to each other in each row may be connected to a touch controller 700 through first touch wires 413. The second touch electrodes 420 connected to each other in each column may be connected to the touch controller 700 through second touch wires 423. The first and second touch wires 413 and 423 may be disposed in a peripheral area PA of a display panel 300, but additionally or alternatively, they may be disposed in a touch active area TA thereof.

End portions of the first and second touch wires 413 and 423 form a pad portion 450 in the peripheral area PA of the display panel 300.

The first and second touch electrodes 410 and 420 may have a transmittance or higher that allows light from the display panel 300 to pass through them. For example, the first and second touch electrodes 410 and 420 may be made of a thin metal layer such as indium tin oxide (ITO), indium zinc oxide (IZO), silver nanowire (AgNw), etc. or a transparent conductive material such as a metal mesh, carbon nanotubes (CNT), etc., but they are not limited thereto.

The first and second touch wires 413 and 423 may include a transparent conductive material contained in the first and second touch electrodes 410 and 420 or a low resistance material such as molybdenum (Mo), silver (Ag), titanium (Ti), copper (Cu), aluminum (Al), and molybdenum/aluminum/molybdenum (Mo/Al/Mo).

The first and second touch electrodes 410 and 420 disposed adjacent to each other form a mutual sensing capacitor that serves as the touch sensing sensor. The mutual sensing capacitor may receive a sensing input signal from either one of the first and second touch electrodes 410 and 420, and may output a variation in charge caused by contact of the external object as a sensing output signal through the other touch electrodes.

A structure of the flexible display device according to the current exemplary embodiment will be described with reference to FIGS. 15 and 16.

Figure 16:
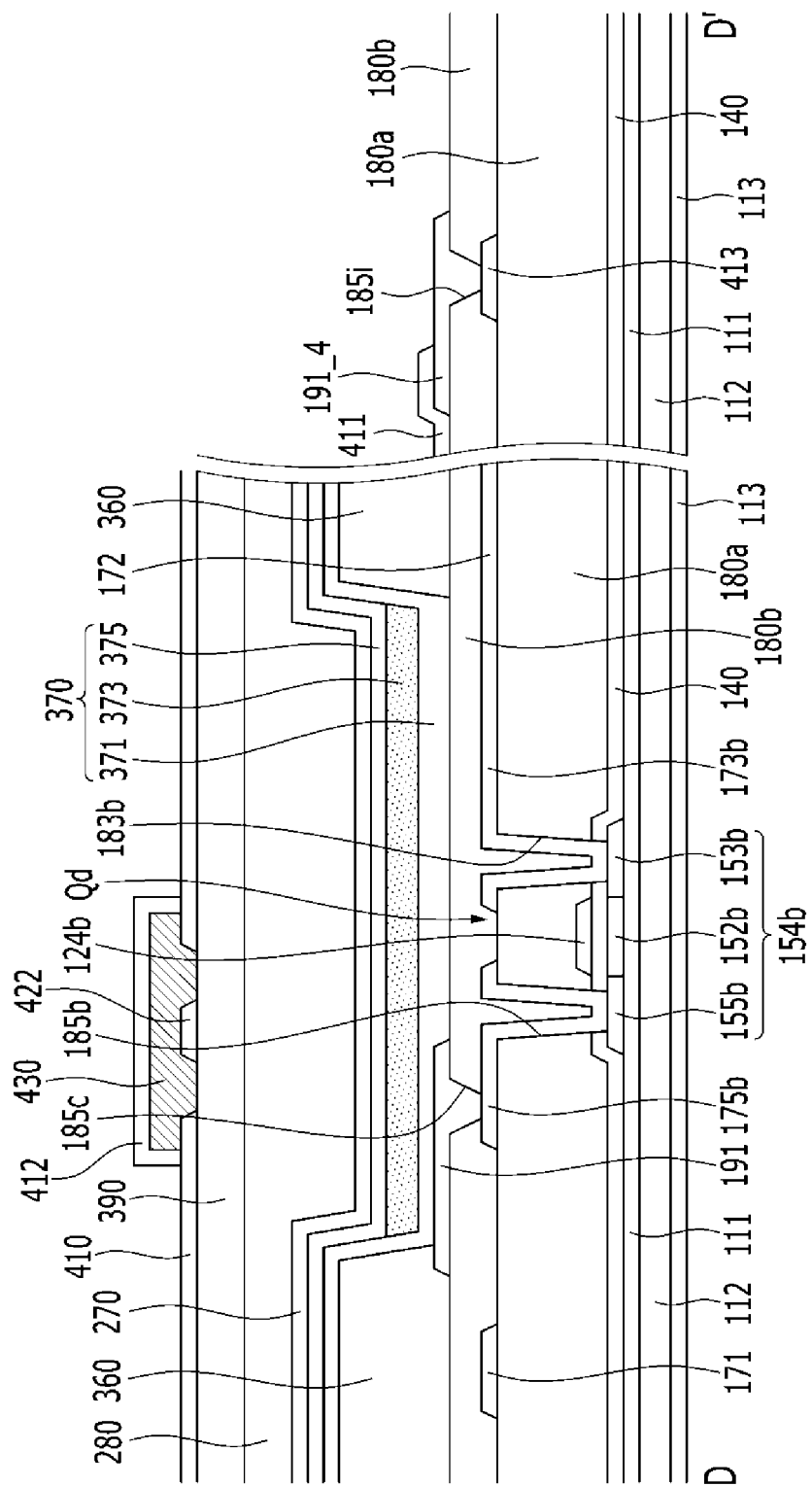
FIG. 16 is a cross-sectional view of a pixel and the touch sensing sensor of the flexible display device according to another exemplary embodiment taken along the line D-D' of FIG. 15.

FIG. 16 is a cross-sectional view of a pixel and a touch sensing sensor of a flexible display device according to the current exemplary embodiment taken along the line D-D' of FIG. 15.

A pixel structure of a display area DA illustrated in FIG. 16 is the same as that illustrated in FIGS. 4 and 5, so a description thereof will be omitted.

First contact wires 411 of a peripheral area PA are formed on a first contact electrode 191_4. The first contact wires 411 are formed on the same layer as first touch electrodes 410 such that they are connected to the first touch electrodes 410.

The first contact electrode 191_4 is connected to first touch wires 413, and end portions of the first touch wires 413 are formed as a pad portion 450.

A structure of the first contact wires 411, the first contact electrode 191_4, and the first touch wires 413 will be exemplary described, but other configurations are possible.

A gate insulating layer 140 that can be formed of a silicon nitride (SiNx), a silicon oxide (SiOx), or the like is disposed on a barrier layer 111. A first passivation layer 180a is disposed on the gate insulating layer 140. A plurality of data conductors including the first touch wires 413 are disposed on the first passivation layer 180a and the gate insulating layer 140.

A second passivation layer 180b that may be formed of an inorganic insulating material, such as a silicon nitride or a silicon oxide, may be disposed on the data conductors. A second passivation layer 180b may be removed of steps to have a smooth surface. The second passivation layer 180b may have a contact hole 185i for exposing an input electrode 173b.

A plurality of fourth contact electrodes 191_4 is disposed on the second passivation layer 180b. The plurality of fourth contact electrodes 191_4 are physically and electrically connected to the first touch wires 413 through the contact hole 185i of the second passivation layer 180b. The plurality of fourth contact electrodes 191_4 may include a semitransmissive conductive material or a transflective conductive material, but are not limited thereto.

The first contact wires 411 are formed on the fourth contact electrode 191_4 such that they are connected to the first touch electrodes 410.

According to the manufacturing method of the display device according to the exemplary embodiment, the wires 413 and 423 and the TX driving unit 414 connected to the touch electrodes are integrally formed in the peripheral area PA when forming the pixels, thereby simplifying the manufacturing process of the display device.

According to exemplary embodiments, the processes described herein to facilitate image signal processing and the display of images via the image display panel and touch panel may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the display device including image display unit 200 may include or otherwise be associated with one or more memories including code (e.g., instructions) configured to cause the image display unit 200 to perform one or more of the processes and/or features described herein.

Memory described herein may be any non-transitory medium that participates in providing code/instructions to the one or more software, hardware, and/or firmware for execution. Such memories may take many forms, including but not limited to non-volatile media and volatile media. Non-volatile media include, for example, optical or magnetic disks. Volatile media include dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Effects of the flexible display device according to exemplary embodiments of the present invention will be described.

According to the exemplary embodiment, a manufacturing process of the display device including the touch sensing sensor can be simplified and thus the cost can be reduced. The thickness of the display device including the touch sensing sensor may be reduced and, thus, the optical characteristic may be improved. Impurities such as the moisture and the like may be prevented from permeating into the touch sensing sensor, thereby reducing the defects of the touch sensing sensor and enhancing the durability of the flexible display device when it is bent.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a substrate comprising a display area and a peripheral area outside the display area;
   pixel electrodes disposed on the substrate in the display area;
   a first transistor connected to a first pixel electrode among the pixel electrodes;
   an encapsulation layer disposed on the first transistor;
   a touch sensing layer disposed on the encapsulation layer, the touch sensing layer comprising touch electrodes;
   a contact electrode disposed on the substrate in the peripheral area;
   a second transistor disposed in the peripheral area, the second transistor being configured to apply a signal to the touch electrodes via the contact electrode;
   a contact wire extending from a touch electrode among the touch electrodes, the contact wire being connected to the second transistor via the contact electrode;
   a first passivation layer disposed on the substrate, the first passivation layer comprising a first contact hole disposed in the peripheral area; and a second passivation layer disposed between the first passivation layer and the substrate, the second passivation layer comprising a second contact hole, wherein:
the first transistor and the second transistor are disposed in the same layer on the substrate;
materials of the pixel electrode and the contact electrode are equivalent;
materials of the contact wire and the contact electrode are different;
the contact electrode is at least partially disposed in the first contact hole;
the first contact hole exposes a portion of an electrode of the second transistor;
the electrode of the second transistor is at least partially disposed in the second contact hole;
the first contact hole is spaced apart from the second contact hole;
the contact wire overlaps the contact electrode and the second transistor; and
the contact wire is directly connected to the contact electrode.

2. The display device of claim 1, further comprising: touch wires disposed on the substrate, the touch wires comprising end portions, wherein the end portions form a pad portion.

3. The display device of claim 2, wherein:
the touch electrodes comprise:
first touch electrodes; and
second touch electrodes spaced apart from the first touch electrodes, the first touch electrodes and the second touch electrodes being alternately arranged on the substrate;
the first touch electrodes are arranged in a first direction and are electrically connected to each other via first connecting portions; and
the second touch electrodes are arranged in a second direction different from the first direction, the second touch electrodes being connected to each other via second connecting portions.

4. The display device of claim 3, further comprising: an insulating layer disposed between the first connecting portions and the second connecting portions.

5. The display device of claim 4, wherein:
the second connecting portions are disposed in the same layer as the second touch electrodes such that the second connecting portions are integrally formed with the second touch electrodes; and
the first connecting portions are disposed in a different layer than the first touch electrodes.

6. The display device of claim 5, wherein the insulating layer is disposed between the first connecting portions and the substrate.

7. A method of driving the display device of claim 1, the method comprising:
applying a driving signal to a driving signal line connected to the first pixel electrode via the first transistor, a touch electrode among the touch electrodes overlapping the driving signal line; and
applying the driving signal to the touch electrodes, the touch electrodes being, in a view normal to the substrate, spaced apart from the driving signal line.

8. The method of claim 7, further comprising:
applying the driving signal to the touch electrode overlapping the driving signal line during a period when the driving signal is not applied to the driving signal line.

9. A method of manufacturing a display device, the method comprising:
forming a first transistor in a display area on a substrate and a second transistor in a peripheral area on the substrate, the peripheral area being outside the display area;
forming a pixel electrode electrically connected to the first transistor and a contact electrode electrically connected to the second transistor;
forming an encapsulation layer on the first transistor; and
forming touch electrodes and contact wires on the encapsulation layer, a first touch electrode among the touch electrodes being electrically connected to the second transistor via a first contact wire among the contact wires,
wherein forming the first transistor, the second transistor, the pixel electrode, the contact electrode, and the first contact wire comprises:
forming an active layer on the substrate;
forming a gate electrode on the active layer;
forming a gate insulating layer on the gate electrode;
forming contact holes in the gate insulating layer;
forming a passivation layer on the gate insulating layer;
forming contact holes in the passivation layer;
forming a source electrode on the gate insulating layer and in a contact hole among the contact holes in the passivation layer, and forming a drain electrode in a contact hole among the contact holes in the passivation layer, the source electrode contacting the active layer via a first contact hole among the contact holes in the gate insulating layer, the drain electrode contacting the active layer via a second contact hole among the contact holes in the gate insulating layer;
forming an organic insulating layer on the source electrode and the drain electrode;
forming contact holes in the organic insulating layer;
forming the pixel electrode in a first contact hole among the contact holes in the organic insulating layer and the contact electrode in a second contact hole among the contact holes in the organic insulating layer, materials of the pixel electrode and the contact electrode being equivalent; and
forming the first contact wire on the contact electrode in the peripheral area, the first contact wire being formed of a different material than the contact electrode, and wherein:
a first contact hole among the contact holes of the passivation layer exposes a portion of an electrode of the second transistor;
the electrode of the second transistor is at least partially disposed in the first contact hole the passivation layer and a first contact hole among the contact holes of the gate insulating layer;
the first contact hole of the passivation layer is spaced apart from the second contact hole of the organic insulating layer;
the contact wire overlaps the contact electrode and the second transistor; and
the contact wire is directly connected to the contact electrode.

10. The method of claim 9, wherein forming the touch electrodes comprises:
forming first touch electrodes extending in a first direction, the first touch electrodes comprising the first touch electrode;

forming second touch electrodes extending in a second direction crossing the first direction, the second touch electrodes being electrically connected to each other through second connecting portions; and forming first connecting portions connecting adjacent first touch electrodes to each other.

11. The method of claim 10, wherein forming the first connecting portions comprises:

forming an insulating layer on the second connecting portions; and forming, after forming the insulating layer, the first connecting portions on the insulating layer, opposite ends of the first connecting portions electrically contacting the adjacent first touch electrodes.

* * * * *